(12) United States Patent
Abe et al.

(10) Patent No.: US 7,878,538 B2
(45) Date of Patent: Feb. 1, 2011

(54) AIRBAG AND AIRBAG APPARATUS

(75) Inventors: Kazuhiro Abe, Tokyo (JP); Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 175 days.

(21) Appl. No.: 12/230,736

(22) Filed: Sep. 4, 2008

(65) Prior Publication Data

US 2009/0121461 A1 May 14, 2009

(30) Foreign Application Priority Data

Nov. 9, 2007 (JP) ............................. 2007-292236

(51) Int. Cl.
*B60R 21/239* (2006.01)
(52) U.S. Cl. ..................... 280/739; 280/743.2; 280/736
(58) Field of Classification Search .................. 280/739, 280/743.2, 736
See application file for complete search history.

(56) References Cited

U.S. PATENT DOCUMENTS

| 6,832,778 | B2 * | 12/2004 | Pinsenschaum et al. ..... 280/739 |
| 7,614,654 | B2 * | 11/2009 | Williams ................. 280/743.1 |
| 7,651,130 | B2 * | 1/2010 | Bauberger ............... 280/743.2 |
| 2005/0098990 | A1 * | 5/2005 | Pinsenschaum et al. ..... 280/739 |
| 2005/0236822 | A1 * | 10/2005 | Rose et al. ................. 280/739 |
| 2005/0248137 | A1 | 11/2005 | Delventhal et al. |
| 2006/0151979 | A1 | 7/2006 | DePottey et al. |
| 2006/0192371 | A1 * | 8/2006 | Abe ........................... 280/739 |
| 2007/0045997 | A1 * | 3/2007 | Abe et al. .................... 280/729 |
| 2007/0145729 | A1 * | 6/2007 | Ishiguro et al. ............. 280/739 |
| 2009/0020989 | A1 | 1/2009 | Bauberger |
| 2009/0039630 | A1 * | 2/2009 | Schneider et al. ........... 280/740 |

FOREIGN PATENT DOCUMENTS

| FR | 2 757 465 | 6/1998 |
| JP | H06-127330 | 5/1994 |
| JP | 2000-142307 A | 5/2000 |
| JP | 2007-216943 A | 8/2007 |
| JP | 2007-223396 | 9/2007 |
| WO | WO 2004/009404 | 1/2004 |
| WO | WO 2006/041547 | 4/2006 |
| WO | WO 2006/041552 | 4/2006 |

* cited by examiner

*Primary Examiner*—Ruth Ilan
(74) *Attorney, Agent, or Firm*—Manabu Kanesaka

(57) ABSTRACT

An airbag is constructed such that a gas-discharging amount from a venthole becomes largest when an occupant contacts a center portion, in the left and right direction, of an occupant-facing surface of the expanded airbag. In the airbag, a hanging strap couples a center portion of a front panel and a rear panel. A lid body covers an open-and-close venthole from outside the airbag, and the hanging strap is coupled by a tether. In a case that the airbag is expanded, the hanging strap and the tether are tensed, and the lid body is brought to a state to close the open-and-close venthole. A loosening amount of the hanging strap and the tether becomes largest when an occupant contacts the center portion of the front panel to retreat, and an opening amount of the open-and-close venthole also becomes largest.

13 Claims, 17 Drawing Sheets

AIRBAG AND AIRBAG APPARATUS

BACKGROUND OF THE INVENTION AND RELATED ART STATEMENT

The present invention relates to an airbag provided with a venthole that absorbs an impact by discharging a gas from an inside of an airbag to an outside thereof and a limiting member that limits a discharge of a gas from the venthole, and more specifically, it relates to an airbag constructed in a manner such that the venthole is closed until an object contacts an occupant-facing surface of the expanded airbag, and that the venthole is opened when the object contacts the occupant-facing surface of the expanded airbag and thereby the occupant-facing surface is retreated. Further, the present invention relates to an airbag apparatus provided with the airbag.

Incidentally, in the explanation below, the upper, lower, left, and right correspond to the upper, lower, left, and right for a person who faces an occupant-facing surface of an expanded airbag.

In addition, in the present invention, "object" refers to a human body seated in a seat, a child seat mounted on the seat, a package, or the like.

Hitherto, it is well known that a venthole is provided with an airbag, and a vehicle occupant or the like is softly received by means of the airbag by discharging a gas from the inside of the airbag through the venthole when the vehicle occupant or the like hits the expanded airbag.

Japanese Unexamined Patent Application Publication No. 6-127330 discloses an airbag, which is constructed in a manner such that a venthole is closed until an occupant contacts an occupant-facing surface of the expanded airbag, and that the venthole is opened when the occupant contacts the occupant-facing surface of the expanded airbag and thereby the occupant-facing surface is retreated.

The airbag described in the same publication is configured to have a bag shape by stitching each of peripheral edge portions of an upper base cloth and a lower base cloth having an approximately round shape. In the same publication, the upper base cloth constitutes the occupant-facing surface of the airbag. A gas-flowing inlet where an inflator (gas generator) is inserted is provided at a center of the lower base cloth. A venthole is disposed at a position situated near an outer peripheral side in relation to the gas-flowing inlet of the lower base cloth.

In the same publication above, as illustrated in FIG. 2 thereof, four ventholes are provided in the lower base cloth, and these ventholes are disposed at an upper side, a lower side, a left side, and a right side of the gas-flowing inlet, respectively, to be equally spaced in a peripheral direction of the airbag.

In the lower base cloth, slits are respectively provided in an area between these ventholes and the gas-flowing inlet, and straps are respectively inserted through these slits. One end side of each strap disposed in an inside of the airbag is stitched to an airbag-inside surface of the upper base cloth. Further, the other end side of each of the straps disposed outside the airbag is pulled around an outer peripheral side of the lower base cloth in a manner so as to traverse the venthole nearest to each of the slits, from the slit where each of the straps is inserted, along an airbag-outside surface of the lower base cloth, and is stitched to a position situated near an outer peripheral side of the lower base cloth in relation to each of the ventholes.

The aforementioned one end side of the strap that covers the upper side venthole is stitched to a position in the vicinity of a middle portion between a center portion and an outer peripheral portion of the upper base cloth at an upper side in relation to a center portion of the upper base cloth. The aforementioned one end side of the strap that covers the lower side venthole is stitched to the position in the vicinity of the middle portion between the center portion and the outer peripheral portion of the upper base cloth at a lower side in relation to the center portion of the upper base cloth. The aforementioned one end side of the strap that covers the left side venthole is stitched to the position in the vicinity of the middle portion between the center portion and the outer peripheral portion of the upper base cloth at a left side in relation to the center portion of the upper base cloth. Furthermore, the aforementioned one end side of the strap that covers the right side venthole is stitched to a position in the vicinity of the middle portion between the center portion and the outer peripheral portion of the upper base cloth at a right side in relation to the center portion of the upper base cloth.

In the same publication, when the airbag is expanded, each strap is under tension along with a separating operation of the upper base cloth and the lower base cloth of the airbag. At this moment, the aforementioned other end side of each of the straps is overlapped with each of the ventholes while being tensed along the airbag-outside surface of the lower base cloth, and each of the ventholes is closed. Thereby, a discharge of a gas from each of the ventholes is limited, and the inside of the airbag is rapidly brought to a high pressure state, and the airbag is rapidly expanded.

When the occupant contacts the upper base cloth of the expanded airbag, and the upper base cloth is retreated toward the inside of the airbag, each of the straps is loosened and the aforementioned other end side of each of the straps is spaced apart from each of the ventholes by means of gas pressure in the inside of the airbag. Thereby, each of the ventholes is opened and the gas is discharged from each of the ventholes toward an outside of the airbag. As a result, the occupant is softly received by means of the airbag.

As described above, in the airbag in the aforementioned Japanese Unexamined Patent Application Publication No. 6-127330, the ventholes are respectively provided at the upper side, the lower side, the left side, and the right side of the gas-flowing inlet relative a center of the lower base cloth, and the aforementioned one end side of each of the straps that covers the ventholes is respectively connected to each portion of the upper side, the lower side, the left side, and the right side in relation to the center portion of the upper base cloth.

Consequently, in a state that the airbag is expanded, in a case that the occupant contacts a right end side or a left end side in relation to the center portion of the upper base cloth in a displaced manner, the left side venthole or the right side venthole is opened earlier as compared to a case that the occupant contacts the center portion of the upper base cloth, and there is a possibility that an opening amount thereof is brought to be larger.

It is an object of the present invention to provide an airbag capable of sufficiently discharging a gas from a venthole toward an outside of the airbag when an occupant contacts a center portion, in a left and right direction, of an occupant-facing surface of the expanded airbag, and suppressing the discharge of the gas to the outside of the airbag when the occupant contacts a left end side or a right end side in relation to the center portion, in the left and right direction, of the occupant-facing surface of the expanded airbag, in the airbag constructed in a manner such that the venthole is closed until the occupant contacts the occupant-facing surface of the expanded airbag, and the venthole is opened when the occupant contacts the occupant-facing surface of the expanded airbag and the occupant-facing surface is thereby retreated, and to provide an airbag apparatus provided with the airbag.

Further objects and advantages of the invention will be apparent from the following description of the invention.

SUMMARY OF THE INVENTION

In an airbag according to the first aspect of the invention, an airbag comprises an open-and-close type venthole and a limiting member for limiting a discharge of a gas from the open-and-close type venthole. The airbag is constructed such that the limiting member causes the open-and-close type venthole to be closed, or to be opened by a small amount, when an object does not contact an outer surface of the airbag, and causes the open-and-close type venthole to be opened, or to be opened by a large amount so that the gas is discharged outside the airbag from the open-and-close type venthole, when the object contacts the outer surface of the expanded airbag and thereby causes the outer surface of the airbag to retreat toward the inside of the airbag during expansion of the airbag. The limiting member is constructed such that the total amount of the gas that is discharged from the open-and-close type venthole becomes largest, when the object contacts a center portion, in a left and right direction, of an occupant-facing surface of the expanded airbag.

In the airbag according to the second aspect, the airbag is formed according to the first aspect, wherein the limiting member is constructed such that a time until the open-and-close type venthole is caused to be opened, or to be opened by a large amount after the object contacts the outer surface of the airbag becomes shortest, when the object contacts the center portion, in the left and right direction, of the occupant-facing surface of the expanded airbag.

In the airbag according to the third aspect, the airbag is formed according to the second aspect, wherein the limiting member is constructed such that, the more the position on the expanded airbag, with which the object contacts, becomes spaced apart from the center portion, in the left and right direction, of the occupant-facing surface toward both end sides in the left and right direction, the longer the time until the open-and-close type venthole is caused to be opened, or to be opened by a large amount after the object contacts the outer surface of the airbag.

In the airbag according to the fourth aspect, the airbag is formed according to any one of the first to third aspects, wherein the limiting member is constructed such that the open-and-close type venthole is caused to be closed, or to be opened by a small amount, by applying tension force to the inside of the airbag, and the open-and-close type venthole is caused to be opened, or to be opened by a large amount, by reducing the tension force applied, and the airbag further includes a connecting member for connecting the limiting member and the center portion, in the left and right direction, of the occupant-facing surface, and when the airbag is expanded, and when the object does not contact the occupant-facing surface, the connecting member is under tension between the occupant-facing surface and the limiting member, and thereby the tension force applied to the inside of the airbag is added to the limiting member so that the open-and-close type venthole is caused to be closed, or to be opened by a small amount. When the object contacts the occupant-facing surface of the expanded airbag and causes the occupant-facing surface to retreat, the connecting member is loosened and thereby the tension force that is added to the limiting member is reduced so that the open-and-close type venthole is caused to be opened, or to be opened by a large amount.

In the airbag according to the fifth aspect, the airbag is formed according to the fourth aspect, wherein an inner member for coupling the center portion, in the left and right direction, of the occupant-facing surface during the expansion of the airbag with a side of the airbag opposite to the occupant is provided in the airbag, and the connecting member is connected to the inner member.

In the airbag according to the sixth aspect, the airbag is formed according to the fourth or fifth aspect, wherein the limiting member is a lid body that covers the open-and-close type venthole. When the airbag is expanded, the connecting member between the occupant-facing surface and the lid body is under tension, and thereby a movement of the lid body to an outside of the airbag is blocked, and the lid body is overlapped with the open-and-close type venthole, and the open-and-close type venthole is caused to be closed, or to be opened by a small amount. When the object contacts the occupant-facing surface of the expanded airbag and causes the occupant-facing surface to retreat toward the inside of the airbag, the connecting member is loosened and thereby the lid body is spaced apart from the open-and-close type venthole by means of gas pressure in the inside of the airbag, and the open-and-close type venthole is caused to be opened, or to be opened by a large amount.

In the airbag according to the seventh aspect, the airbag is formed according to the forth or fifth aspect, wherein the limiting member is a binding member that is disposed around a peripheral edge of the open-and-close type venthole, and is capable of binding the open-and-close type venthole by being pulled into the inside of the airbag. When the airbag is expanded, the binding member is pulled into the inside of the airbag via the connecting member, and thereby the open-and-close type venthole is bound by means of the binding member, and the open-and-close type venthole is caused to be closed, or to be opened by a small amount. When the object contacts the occupant-facing surface of the expanded airbag and causes the occupant-facing surface to retreat toward the inside of the airbag, the connecting member and the binding member are loosened and thereby the open-and-close type venthole is caused to be opened, or to be opened by a large amount.

In the airbag according to the eights aspect, the airbag is formed according to the fourth or fifth aspect, wherein the limiting member is a small bag body disposed outside the airbag, in which a gas-flowing inlet is provided on one end side thereof, and the gas-flowing inlet is coupled with the open-and-close type venthole, and the connecting member is coupled with the other end side thereof. Also, a gas-discharging outlet is provided on a side surface between the one end side and the other end side, and the gas is allowed to be discharged outside the airbag from the open-and-close type venthole while passing through the inside of the small bag body and the gas discharging outlet. The airbag further includes a connecting member insertion hole for allowing the inside and outside of the airbag to communicate with each other at a position being spaced apart from the open-and-close type venthole, and the connecting member connects the other end side of the small bag body and the occupant-facing surface while passing through the connecting member insertion hole.

When the airbag is expanded, the connecting member is under tension and thereby the other end of the small bag body is pulled to a connecting member insertion hole side and the small bag body is overlapped with the outer surface of the airbag, and thereby the gas-discharging outlet is caused to be closed, or to be opened by a small amount. When the object contacts the occupant-facing surface of the expanded airbag, and causes the occupant-facing surface to retreat toward the inside of the airbag, the connecting member is loosened and thereby the small bag body becomes spaced apart from the outer surface of the airbag and the gas-discharging outlet is caused to be opened, or to be opened by a large amount.

In the airbag according to the ninth aspect, the airbag is formed according to the eighth aspect, wherein the gas-discharging outlet is formed of a slit extending in a direction connecting the one end side and the other end side of the small bag body.

In the airbag according to the tenth aspect, the airbag is formed according to any one of the first to ninth aspect, wherein the open-and-close type venthole is disposed in the vicinity of a middle portion, in a left and right direction, of the surface of the airbag on a side opposite to the occupant, and at an upper side or a lower side in relation to a center in an upper and lower direction during the expansion of the airbag.

In the airbag according to the eleventh aspect, the airbag is formed according to any one of the first to ninth aspect, wherein the open-and-close type ventholes are respectively disposed at a left-half side and a right-half side of the surface of the airbag on the side opposite to the occupant, or on a left side surface and a right side surface of the airbag in a substantially symmetrical positional relationship while sandwiching the middle portion, in a left and right direction, of the airbag during the expansion of the airbag.

In an airbag apparatus according to the twelfth aspect, the airbag is formed according to any one of the first to eleventh aspects and an inflator for expanding the airbag.

In the airbag and the airbag apparatus with respect to the present invention, since the limiting member that limits the discharge of the gas from the open-and-close type venthole is constructed such that when the object contacts the center portion, in the left and right direction, of the occupant-facing surface of the expanded airbag, the total amount of the gas that is discharged from the open-and-close type venthole becomes largest, it is possible to sufficiently discharge the gas to the outside of the airbag from the open-and-close type venthole when the occupant contacts the center portion, in the left and right direction, of the occupant-facing surface of the expanded airbag, and to suppress the discharge of the gas to the outside of the airbag when the occupant contacts the left side or the right side of the occupant-facing surface in a deviated manner in relation to the center portion in the left and right direction.

In the present invention according to the second aspect, it is preferable that the limiting member is constructed such that a time until the open-and-close type venthole is caused to be opened, or to be opened by a large amount after the object contacts the outer surface of the airbag becomes shortest, when the object contacts the center portion, in the left and right direction, of the occupant-facing surface of the expanded airbag. Accordingly, it becomes possible to rapidly discharge the gas from the open-and-close type venthole to the outside of the airbag, when the occupant contacts the center portion, in the left and right direction, of the occupant-facing surface of the expanded airbag, and to sufficiently receive the object by means of delaying the discharge of the gas to the outside of the airbag when the occupant contacts the left side or the right side in relation to the center portion, in the left and right direction, of the occupant-facing surface in the deviated manner.

In this case, according to the third aspect, it is preferable that the limiting member is constructed such that the more the position on the expanded airbag, with which the object contacts, becomes spaced apart from the center portion, in the left and right direction, of the occupant-facing surface of the airbag toward both end sides in the left and right direction, the longer the time until the open-and-close type venthole is caused to be opened, or to be opened by a large amount after the object contacts the outer surface of the airbag.

In general, although the airbag is expanded to have a shape in which the more the position on the occupant-facing surface approaches both end sides in the left and right direction thereof, the smaller the thickness becomes. However, by constructing the airbag according to the third aspect, even when the object contacts one end side or the other end side in the left and right direction of the occupant-facing surface, the occupant-facing surface of the airbag is suppressed to be retreated, and it becomes possible to sufficiently receive the object.

In the fourth aspect, during expansion of the airbag, the connecting member is under tension between the occupant-facing surface and the limiting member when the object does not contacts the occupant-facing surface of the airbag, and thereby the tension force to an inside of the airbag is added to the limiting member and the open-and-close type venthole is caused to be closed, or to be opened by a small amount. Further, when the object contacts the occupant-facing surface of the expanded airbag, and causes the occupant-facing surface to retreat, the connecting member is loosened and thereby the tension force added to the limiting member is reduced and the open-and-close type venthole is caused to be opened, or to be opened by a large amount.

In the present invention according to the fifth aspect, an inner member for coupling the center portion, in the left and right direction, of the occupant-facing surface during the expansion of the airbag with a side of the airbag opposite to the occupant may be provided in the airbag, and the connecting member may be coupled with the inner member.

In the sixth aspect, the limiting member is formed of a lid body that covers the open-and-close type venthole. Such a lid body is easy in structure. Incidentally, in the present invention, this lid body may be the one that covers the open-and-close type venthole from an inside of the airbag, and may be the one that covers the open-and-close type venthole from an outside of the airbag.

In the seventh aspect, the limiting member is disposed around a peripheral edge of the open-and-close type venthole, and is a binding member capable of binding the open-and-close type venthole by being pulled to the inside of the airbag. In the seventh aspect, when the airbag is expanded, the binding member is pulled to the inside of the airbag via the connecting member, and thereby the open-and-close type venthole is bound by means of the binding member, and the open-and-close type venthole is caused to be closed, or to be opened by a small amount. In addition, when the object contacts the expanded airbag, and causes the occupant-facing surface to retreat, the connecting member and the binding member are loosened and thereby the open-and-close type venthole is caused to be opened, or to be opened by a large amount.

In the eighth aspect, the limiting member is a small bag body that is disposed outside the airbag, which is provided with a gas-flowing inlet on one end side, and the gas-flowing inlet is coupled with the open-and-close type venthole, and the connecting member is coupled with the other end side, and the gas-discharging outlet is provided on a side surface between the one end side and the other end side, and the gas is allowed to be discharged outside the airbag while passing through the inside of the small bag body and the gas-discharging outlet from the open-and-close type venthole. Furthermore, in the aspect, a connecting member insertion hole that allows the inside and outside of the airbag to communicate with each other is provided at a position being spaced apart from the open-and-close type venthole in the airbag, and the connecting member connects the other end side of the small bag body and the occupant-facing surface while passing through the connecting member insertion hole.

In the eighth aspect, when the airbag is expanded, the connecting member is under tension and thereby the other end side of the small bag body is pulled to the connecting member insertion hole side and the small bag body is overlapped with the outer surface of the airbag, and the gas-discharging outlet is caused to be closed, or to be opened by a small amount. Moreover, when the occupant contacts the occupant-facing surface of the expanded airbag and causes the occupant-facing surface to retreat toward the inside of the airbag, the connecting member is loosened and thereby the small bag body becomes spaced apart from the outer surface of the airbag, and the gas-discharging outlet is formed to be opened, or to be opened by a large amount.

In this aspect, according to the ninth aspect, it is preferable that the gas-discharging outlet is formed of a slit extending in a direction to connect the one end side and the other end side of the small bag boy. When the gas-discharging outlet is thus constructed, since the tension force is added to the side surface of the small bag body in an extending direction of the slit when the other end side of the small bag body is pulled by means of the connecting member during the expansion of the airbag, the edge portion of both sides of the slit is under tension and is brought to a closed state, and a closing characteristic of the gas-discharging outlet becomes good.

In the present invention, according to the tenth aspect, the open-and-close type venthole may be disposed in the vicinity of a middle portion, in a left and right direction, of a surface on a side opposite to the occupant, and at an upper side or a lower side in relation to a center in an upper and lower direction during the expansion of the airbag. Alternatively, the open-and-close type ventholes may be provided on a left-half side and a right-half side of the surface on the side opposite to the occupant, or on a left side surface and a right side surface of the airbag.

In a case that the open-and-close type ventholes are respectively provided on the left-half side and the right-half side of the surface of the airbag on the side opposite to the occupant, or on the left side surface or the right side surface of the airbag, as disclosed in the eleventh aspect, it is preferable that the open-and-close type ventholes are disposed in a substantially symmetrical positional relationship while sandwiching the middle portion, in a left and right direction, of the airbag. By means of thus constructing, the left and right open-and-close type ventholes can approximately be evenly opened and closed.

Incidentally, in the present invention, the "substantially symmetrical" means that the open-and-close type ventholes on the left and right may not perfectly be disposed in the symmetrical positional relationship, and a slight difference (within an area of about ±50 mm) may be applicable between a distance from the middle portion in the left and right direction of the airbag to the left side open-and-close type venthole and a distance from that to the right side open-and-close type venthole, and further, each of the left and right open-and-close type ventholes may be slightly (within an area of about ±50 mm) deviated in the upper and lower direction.

DETAILED DESCRIPTION OF PREFERRED EMBODIMENTS

Hereinbelow, embodiments of the present invention will be explained with reference to the drawings.

Figure 1:
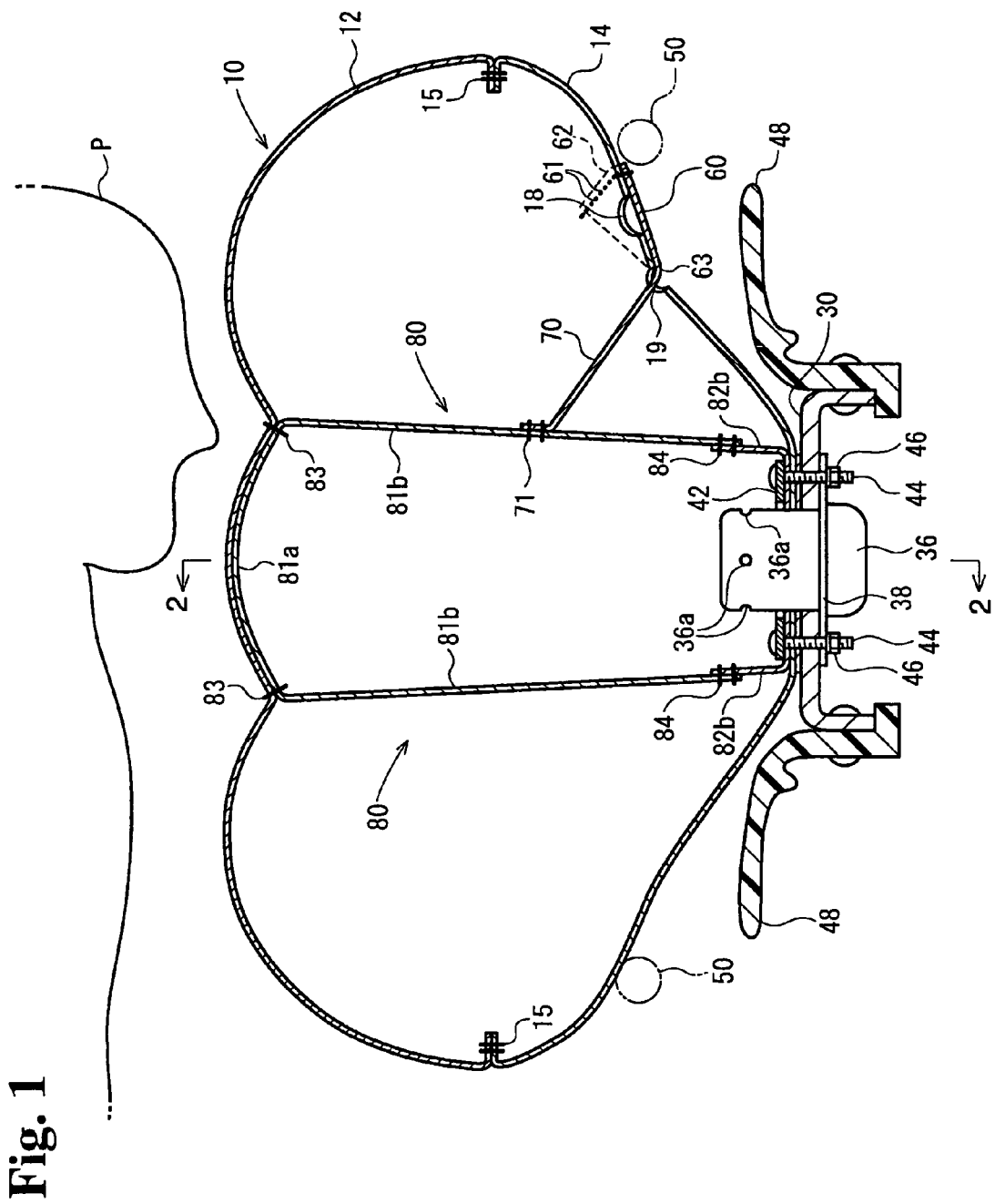
FIG. 1 is a longitudinal cross-sectional view illustrating an airbag and an airbag apparatus with respect to an embodiment.
Figure 2:
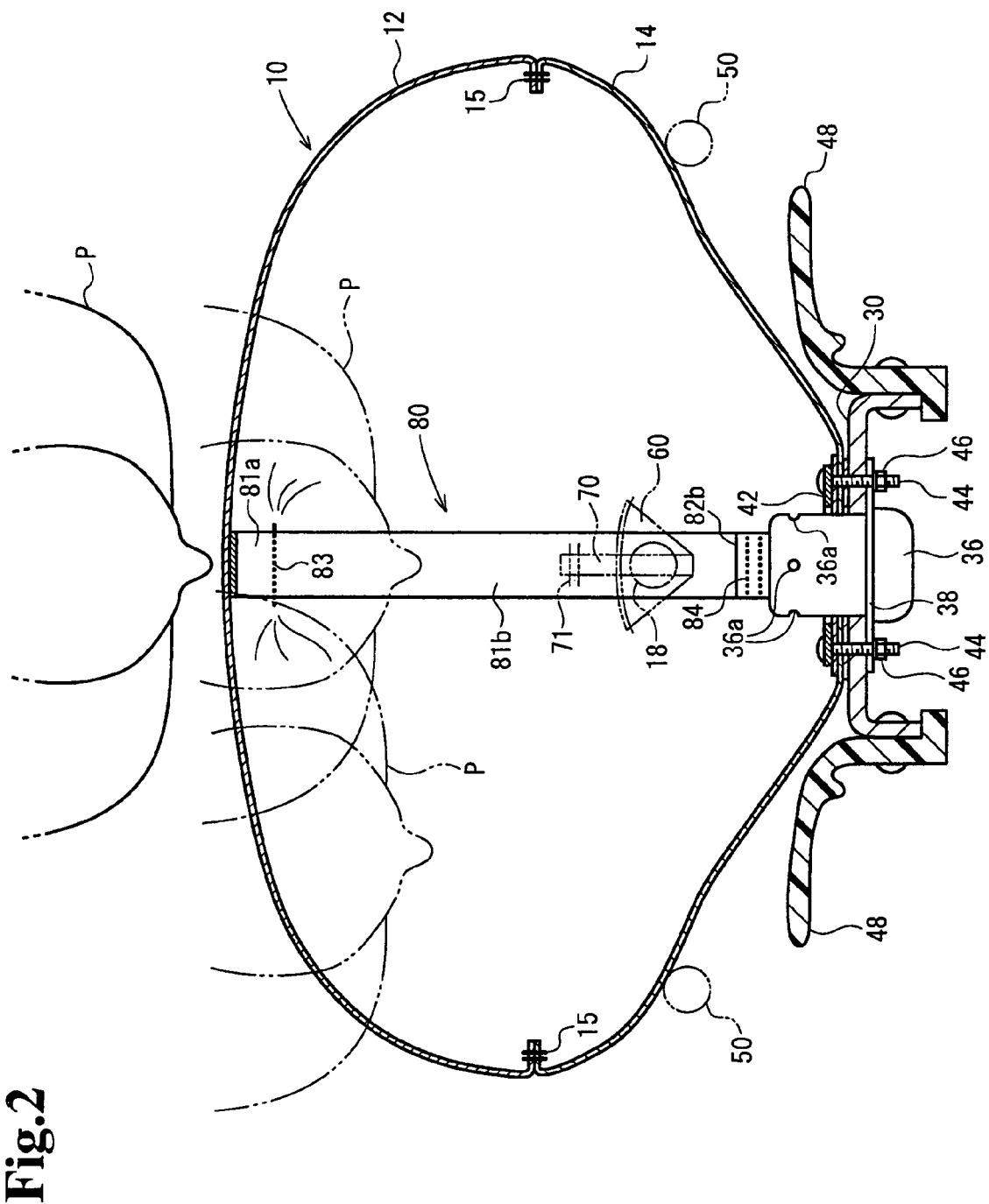
FIG. 2 is a cross-sectional view (horizontal cross-sectional view) taken along a line 2-2 in FIG. 1.
Figure 3:
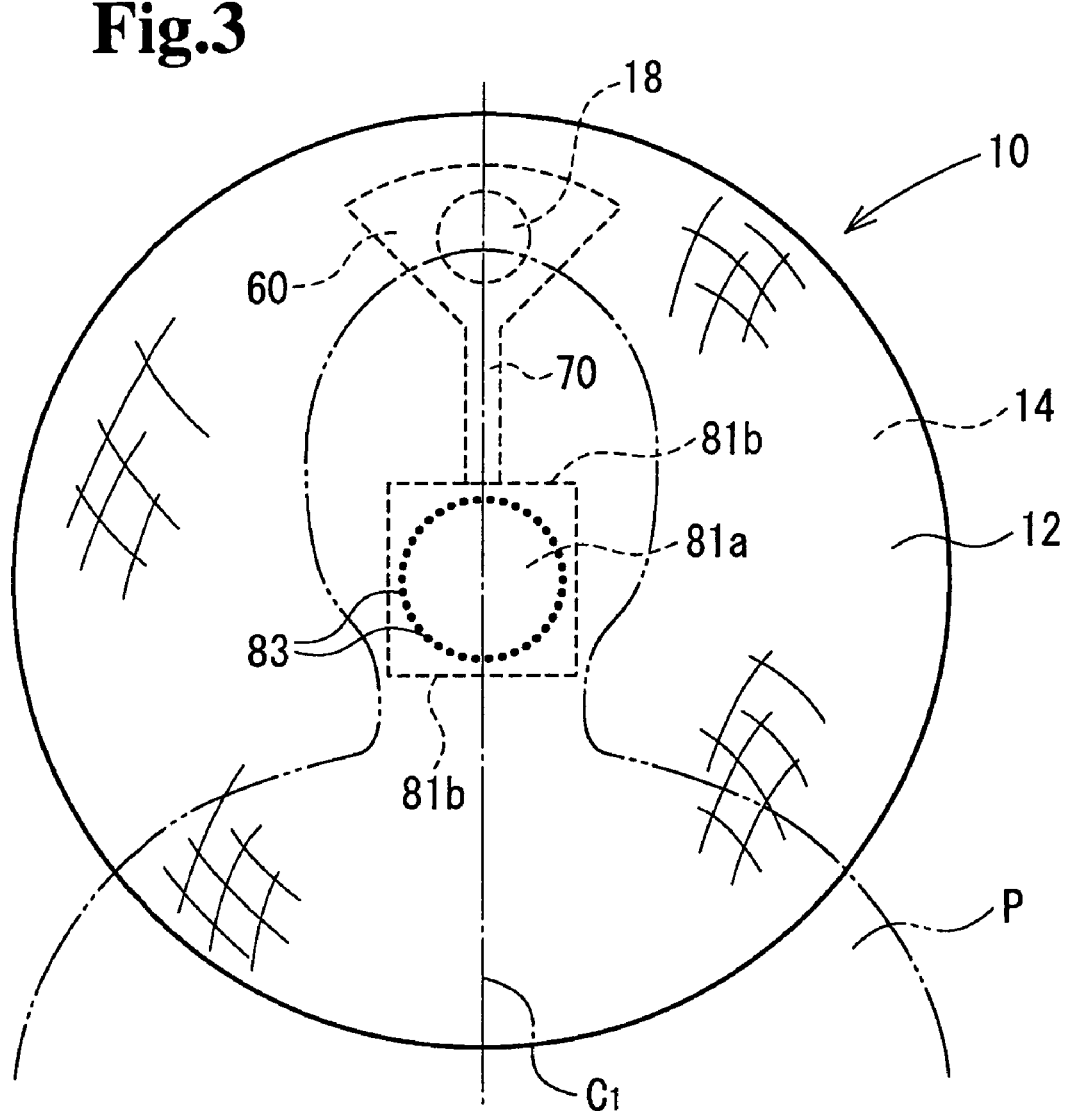
FIG. 3 is a front elevation illustrating the airbag of FIG. 1.
Figure 4:
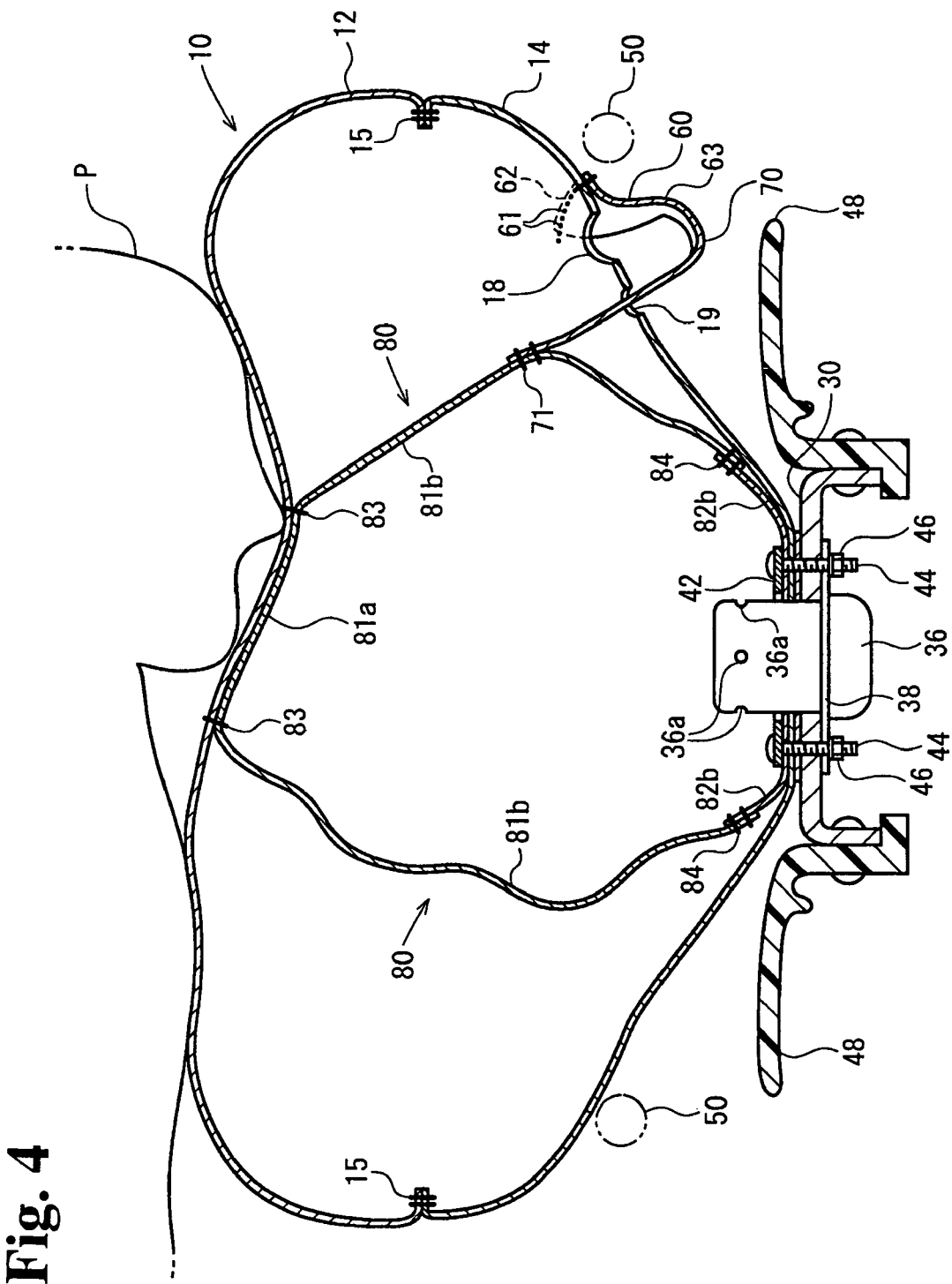
FIG. 4 is a longitudinal cross-sectional view illustrating the airbag and the airbag apparatus of FIG. 1.
Figure 5:
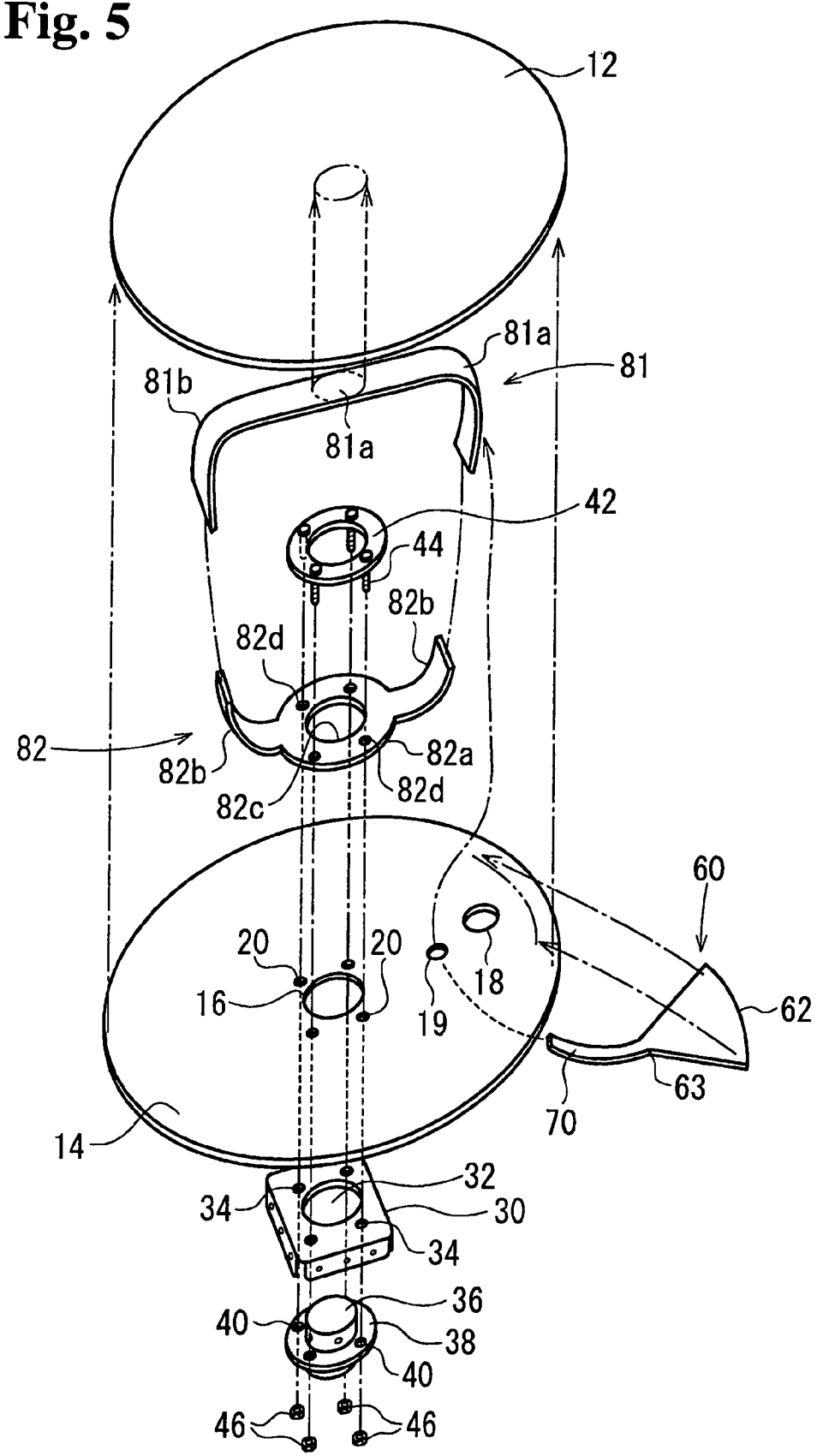
FIG. 5 is an exploded perspective view illustrating the airbag and the airbag apparatus of FIG. 1.

FIG. 1 is a longitudinal cross-sectional view illustrating an airbag and an airbag apparatus with respect to the embodiment, FIG. 2 is a cross-sectional view (horizontal cross-sectional view) taken along a line 2-2 of FIG. 1, FIG. 3 is a front elevation illustrating the airbag, FIG. 4 is a longitudinal cross-sectional view illustrating the airbag and the airbag apparatus, and FIG. 5 is an exploded perspective view illustrating the airbag and the airbag apparatus. Incidentally, FIG. 1 illustrates a state before an occupant P contacts the expanded airbag, and FIG. 4 illustrates a state after the occupant contacts the expanded airbag.

In this embodiment, the airbag 10 is an airbag for use in a driver's seat, which is expanded in a manner so as to cover a steering wheel 50 of a vehicle. In the explanations below, the upper, lower, left, and right correspond to the upper, lower, left, and right when the steering wheel 50 has a steering posture for the vehicle for advancing straight ahead.

The airbag 10 is provided with a front panel 12 constituting an occupant-facing surface, a rear panel 14 constituting an outer surface on a side opposite to the occupant-facing surface, a pair of hanging straps 80 serving as an inner member in which the front panel 12 and the rear panel 14 are coupled at an inside of the airbag 10, ventholes 18 and 19 that allow the inside and an outside of the airbag 10 to communicate with each other, a lid body 60 serving as a limiting member that limits a discharge of a gas from the venthole 18 by covering the venthole 18, a tether 70 serving as a connecting member that couples the lid body 60 to the hanging strap 80 via the venthole 18, and so forth.

In this airbag 10, the venthole 18 is an open-and-close type venthole. Further, the venthole 19 constantly allows the inside and the outside of the airbag 10 to communicate with each other, and is a connecting member insertion hole where the tether 70 is inserted.

Hereinbelow, the venthole 18 is called as the open-and-close type venthole 18, and the venthole 19 is called as the constant-open type venthole 19.

In this embodiment, the open-and-close type venthole 18 and the constant-open type venthole 19 are respectively formed to have approximately round opening. However, the shape of the open-and-close type venthole 18 and the constant-open type venthole 19 is not limited thereto. For example, the open-and-close type venthole 18 and the constant-open type venthole 19 may be formed of a slit shape or the like.

The front panel 12 and the rear panel 14 are formed of a round-shaped woven cloth, respectively. The front panel 12 and the rear panel 14 have an approximately same diameter, and each of outer peripheral edge portions thereof is stitched by means of a seam 15. Thereby, the same are formed into a bag shape. The seam 15 is peripherally provided in a circular ring shape along an outer periphery of the front panel 12 and the rear panel 14. The seam 15 is formed of a stitching thread or the like, however, the same is not limited thereto.

An opening 16 for use in an inflator and the aforementioned ventholes 18 and 19 are provided in the rear panel 14. The opening 16 is disposed at a center of the rear panel 14. Moreover, bolt insertion holes 20 that are penetrated through the rear panel 14 are provided around the opening 16. The open-and-close type venthole 18 and the constant-open type venthole 19 are disposed while lining in a radius direction of the rear panel 14 in this embodiment, and the constant-open type venthole 19 is positioned nearer a center side of the rear panel 14 in relation to the open-and-close type venthole 18.

In this embodiment, as illustrated in FIG. 3, these open-and-close type venthole 18 and the constant-open type venthole 19 are disposed substantially on a centerline $C_1$ extending in an upper-and-lower direction while passing through a center, in a left and right direction, of the rear panel 14 and at an upper side in relation to the opening 16 for use in the inflator at the center of the rear panel 14.

Incidentally, "substantially on a centerline $C_1$," means that the center of the open-and-close type venthole 18 and that of the constant-open type venthole 19 may be slightly deviated (within a degree of 30 mm, in a left and right direction, respectively) from the centerline $C_1$, respectively.

In this embodiment, the lid body 60 is provided so as to cover the open-and-close type venthole 18 from the outside of the airbag 10.

In this embodiment, the lid body 10 is formed of an approximately sector-shaped woven cloth, in which one side 62 (refer to FIG. 5) is curved into a circular arc shape, while a side of a corner portion 63 facing the side 62 serves as a side of a curving center (refer to FIG. 5), as illustrated in FIGS. 2, 3, and 5. Incidentally, a pair of oblique lines (reference numerals are omitted) extending toward the corner portion 63 from both ends of the side 62 is formed to have an approximately the same length with each other.

This lid body 60 is overlapped with the open-and-close type venthole 18 in a posture in which the corner portion 63 is disposed at a position nearer the constant-open type venthole 19 side in relation to the open-and-close type venthole 18, and the side 62 is disposed on a side opposite to the constant-open type venthole 19 while sandwiching the open-and-close type venthole 18. The lid body 60 is stitched to the rear panel 14 along the side 62 by means of a seam 61 (refer to FIGS. 1 and 4). This seam 61 is also extended in a manner so as to curve in a circular arc shape, while the side of the corner portion 63 serves as the side of the curving center.

The constant-open type venthole 19 is disposed at a position nearer the center side of the rear panel 14 in relation to the corner portion 63, namely an area that is not covered by means of the lid body 60, in the rear panel 14, and the same constantly allows the inside and the outside of the airbag 10 to communicate with each other.

One end of the aforementioned tether 70 continues into the corner portion 63 of the lid body 60. In this embodiment, the lid body 60 and the tether 70 are integrally constructed by means of being cut out from one sheet of a base cloth. However, the construction may be formed such that the lid body 60 and the tether 70 are separately provided and the one end of the tether 70 is stitched to the corner portion 63 of the lid body 60.

In this embodiment, each of the hanging straps 80 is composed of a first hanging strap construction member 81 at a side of the front panel 12 and a second hanging strap construction member 82 at a side of the rear panel 14.

In this embodiment, the first hanging strap construction member 81 includes a base piece portion 81a that is disposed at a center portion of the front panel 12, and two of front side-hanging strap half members 81b and 81b that are extended from the base piece portion 81a in opposite directions to each other. The base piece portion 81a is stitched to the center portion of the front panel 12 by means of a seam 83.

Further, in this embodiment, the second hanging strap construction member 82 includes a base piece portion 82a that is disposed at a center portion of the rear panel 14, and two of rear side-hanging strap half members 82b and 82b that are extended from an outer periphery of the base piece portion 82a in opposite directions to each other. As illustrated in FIG. 5, the base piece portion 82a is formed of a round-shaped woven cloth having a diameter smaller than that of the rear panel 14, and at a center of the base piece portion 82a, an opening 82c for use in the inflator to be overlapped with the opening 16 for use in the inflator of the rear panel 14 is provided. Furthermore, bolt insertion holes 82d to be overlapped with the bolt insertion holes 20 are provided around the opening 82c. The base piece portion 82a is disposed in an approximately concentric manner with the rear panel 14, and is stitched to the peripheral edge portion of the opening 16 by means of a seam (illustration is omitted).

Each of the tip end portions of each of the hanging strap half members 81b and 82b of these hanging strap construction members 81 and 82 are stitched by means of the seam 84 (refer to FIGS. 1 and 4), and thereby a pair of hanging straps 80 that couples the front panel 12 and the rear panel 14 is constructed.

In this embodiment, in the hanging strap construction member 81, the base piece portion 81a is stitched to the center portion of the front panel 12 in a posture where the front side-hanging strap half members 81b and 81b are respectively extended above and below from the base piece portion 81a, as illustrated in FIG. 3. Further, in the hanging strap construction member 82, the base piece portion 82a is also stitched to the center portion of the rear panel 14 in a posture where the rear side-hanging strap half members 82b and 82b are respectively extended above and below from the base piece portion 82a. Thereby, as illustrated in FIGS. 1 and 2, each of the hanging straps 80 is disposed at a center portion of the airbag 10 while lining above and below, and each of the respective middle portions in the left and right direction of the front panel 12 and the rear panel 14 is coupled.

The aforementioned tether 70 is inserted into the constant-open type venthole 19, and is pulled into the inside of the airbag 10. The other end portion of the tether 70 opposite to the lid body 60 is stitched to a portion on the way of the upper hanging strap 80 in a longitudinal direction by means of the seam 71. Incidentally, in this embodiment, although the tether 70 is stitched to the front side-hanging strap half member 81b of the upper hanging strap 80, the tether 70 may be stitched to the rear side-hanging strap half member 82b. Furthermore, the tether 70 and the hanging strap 80 (the front side-hanging strap half member 81b or the rear side-hanging strap half member 82b) may be integrally constructed by means of a common woven cloth.

Incidentally, a front side end portion of the upper hanging strap 80 is connected to a position in the front panel 12, which faces a vicinity of a center of a head portion of an occupant P seated in the driver's seat having an average physical size of an adult when the airbag 10 is expanded, as illustrated in FIGS. 1 and 4.

However, in the present invention, the tether 70 serving as a connecting member may be directly connected to a center portion of the front panel 12 without interposing an inner member such as the hanging strap 80.

In a retainer 30 for attaching the airbag 10, an inflator-attaching opening 32 is provided at a center thereof, and bolt insertion holes 34 are provided therearound.

The inflator 36 is formed to have an approximately cylindrical shape, and gas-blowing outlets 36a are provided in a side peripheral surface of a tip end side in a cylinder axis direction thereof. The inflator 36 is constructed to blow out the gas from these gas-blowing outlets 36a in a radiating direction. A flange 38 for fixing the inflator is protruded from the side peripheral surface of the inflator 36 at a portion extending in the cylindrical axis direction (a rear end side in relation to the gas-blowing outlet 36a). Bolt insertion holes 40 are provided in the flange 38. The tip end side of the inflator 36 is fitted into the inflator-attaching opening 32.

When the airbag 10 is attached to the retainer 30, a peripheral edge portion of the opening 16 for use in the inflator of the rear panel 14 is overlapped with a peripheral edge portion of the inflator-attaching opening 32 of the retainer 30. In addition, stud bolts 44 of a pressing ring 42 are inserted into the respective bolt insertion holes 82d of the base piece portion 82a, the bolt insertion holes 20 of the rear panel 14, the bolt insertion holes 34 of the retainer 30, and the bolt insertion holes 40 of the flange 38. Thereafter, a nut 46 is fastened onto each of tip ends thereof, and thus the rear panel 14 and the inflator 36 are fixed to the retainer 30.

Thereafter, the airbag 10 is folded back and a module cover 48 is attached to the retainer 30 in a manner so as to cover the folded-back body of the airbag 10. Thereby, the airbag apparatus is constructed. Incidentally, the airbag 10 may be attached to the retainer 30 in a previously folded-back state.

Although an illustration is omitted, the airbag 10 is folded back in a state that the lid body 60 is overlapped with the open-and-close type venthole 18. By means of thus folding back the airbag 10, the airbag 10 can be expanded in a state that the open-and-close type venthole 18 is closed by means of the lid body 60 from the beginning. Incidentally, the lid body 60 may be constructed to be held in a state to be overlapped with the open-and-close type venthole 18 by means of various holding members such as a fastener or the like.

The airbag apparatus is installed in a steering wheel of an automobile (only a rim 50 of an outer periphery of the steering wheel is illustrated in FIGS. 1, 2, and 4).

At a time of a collision of a vehicle where the thus constructed airbag apparatus is mounted, or the like, the inflator 36 is activated and the gas is blown out into the airbag 10. The airbag 10 is expanded by means of the gas and pushes to open the module cover 48, and is developed into a vehicle interior.

At this moment, the hanging strap 80 is pulled to an occupant side along with the expanding operation of the airbag 10. The tether 70 is pulled to an inside of the airbag 10 along with the stretching operation of the hanging strap 80, and the corner portion 63 of the lid body 60 is pulled to a direction to be spaced apart from the side 62 via the tether 70. Thereby, the lid body 60 is under tension along an outer surface of the airbag 10, and is overlapped with the open-and-close type venthole 18. The open-and-close type venthole 18 is thereby closed. As a result, the discharge of the gas from the open-and-close type venthole 18 is limited and the inside of the airbag 10 is rapidly brought to a state of high internal pressure. The airbag 10 is rapidly expanded and developed.

Thereafter, in a case that the occupant P hits the expanded airbag 10, as illustrated in FIG. 4, the front panel 12 of the airbag 10 is pressed by the occupant P and is retreated toward a rear panel 14 side and the hanging strap 80 is loosened. Thereby, the force that pulls the lid body 60 into the inside of the airbag 10 is released. Thereby, the tension of the lid body 60 is released, and the lid body 60 becomes spaced apart from the open-and-close type venthole 18 by means of gas pressure in the airbag 10, and the open-and-close type venthole 18 is opened. As a result, the gas is discharged from the open-and-close type venthole 18 toward the outside of the airbag 10, and the occupant P is softly received by means of the airbag 10.

In this airbag 10, as illustrated in FIG. 2, since the hanging strap 80 is configured to couple a vicinity of a middle portion in the left and right direction of the front panel 12 with the rear panel 14 side, when the occupant P contacts a center portion, in the left and right direction, of the front panel 12 and causes the center portion to retreat toward the rear panel 14 side, a loosening amount of the hanging strap 80 becomes largest. In contrast, in a case that the occupant P contacts the front panel 12 while being deviated from the center portion, in the left and right direction, of the front panel 12 to a left side or a right side, as illustrated in FIG. 2, a retreating amount of the center portion, in the left and right direction, of the front panel 12 toward the rear panel 14 side becomes smaller as compared to the case that the occupant P directly contacts the center portion. Thereby, the loosening amount of the hanging strap 80 becomes small. The more the position on the front panel 12, with which the occupant P comes in contact, is deviated to a left end side or a right end side of the front panel 12, the smaller the loosening amount of the hanging strap 80 becomes.

Further, in this airbag 10, when the occupant P contacts the center portion, in the left and right direction, of the front panel 12 and causes the center portion to retreat toward the rear panel 14 side, the hanging strap 80 starts loosening in the earliest manner. Furthermore, the more the position on the front panel 12, with which the occupant P contacts, is deviated from the center portion toward the left end side or the right end side of the front panel 12, the later the timing when the hanging strap 80 starts loosening becomes.

In this airbag 10, an opening amount of the open-and-close type venthole 18 (i.e., a separating distance of the lid body 60 from the open-and-close type venthole 18) increases or decreases in proportional to the loosening amount of the hanging strap 80. Accordingly, the opening amount of the open-and-close type venthole 18 becomes largest when the occupant P contacts the center portion, in the left and right direction, of the front panel 12 of the expanded airbag 10, and the more the position on the front panel 12, with which the occupant P contacts, is deviated to the left end side or the right end side of the front panel 12, the smaller the opening amount of the open-and-close type venthole 18 becomes. Moreover, the opening timing of the open-and-close type venthole 18 depends on the timing when the hanging strap 80 starts loosening. Accordingly, the open-and-close type venthole 18 opens in the earliest manner when the occupant P contacts the center portion, in the left and right direction, of the front panel 12, and the more the position on the front panel 12, with which the occupant P contacts, is deviated to the left end side or the right end side of the front panel 12, the later the opening timing of the open-and-close type venthole 18 becomes.

Accordingly, in this airbag 10, it is possible to sufficiently discharge the gas to the outside of the airbag 10 from the open-and-close type venthole 18 when the occupant P contacts the center portion, in the left and right direction, of the front panel 12 of the expanded airbag 10, and to suppress the discharge of the gas to the outside of the airbag 10 when the occupant P contacts the left end side or the right end side in a manner deviated from the center portion, in the left and right direction, of the front panel 12.

In addition, in this airbag 10, it is possible to rapidly discharge the gas from the open-and-close type venthole 18 when the occupant P contacts the center portion, in the left and right direction, of the front panel 12 of the expanded airbag 10, and to sufficiently receive the occupant P by means of delaying the opening timing of the open-and-close type venthole 18 when the occupant P contacts the left end side or the right end side of the front panel 12 in the deviated manner.

Incidentally, as illustrated in FIGS. 1 and 4, the airbag 10 is expanded to have a shape in which the more the position on the airbag 10 approaches an outer peripheral side thereof, the smaller the thickness becomes. However, in this airbag 10, as described above, the more the position on the front panel 12, with which the occupant P contacts, is deviated to the left end side or the right end side of the front panel 12, the smaller the opening amount of the open-and-close type venthole 18 becomes. Thereby, the discharge of the gas to the outside of the airbag 10 is suppressed, and the opening timing of the open-and-close type venthole 18 is delayed. As a result, even when the occupant P contacts the left end side or the right end side of the front panel 12 in the deviated manner, there is no possibility that the front panel 12 collides with a bottom of the airbag 10 (to contact the rear panel 14), and the occupant P can sufficiently be received by means of the airbag 10.

Figure 6:
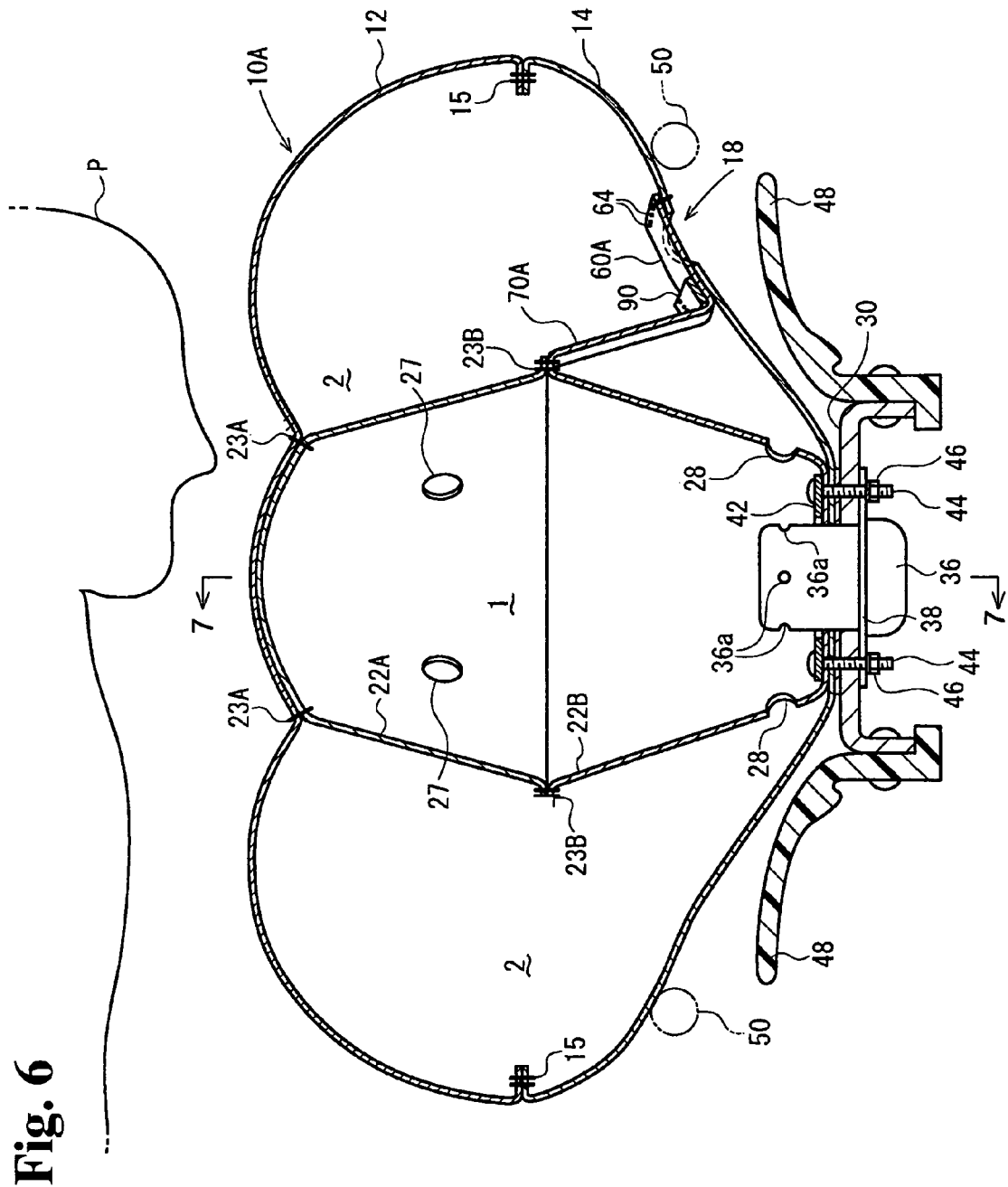
FIG. 6 is a longitudinal cross-sectional view illustrating an airbag and an airbag apparatus with respect to an embodiment.
Figure 7:
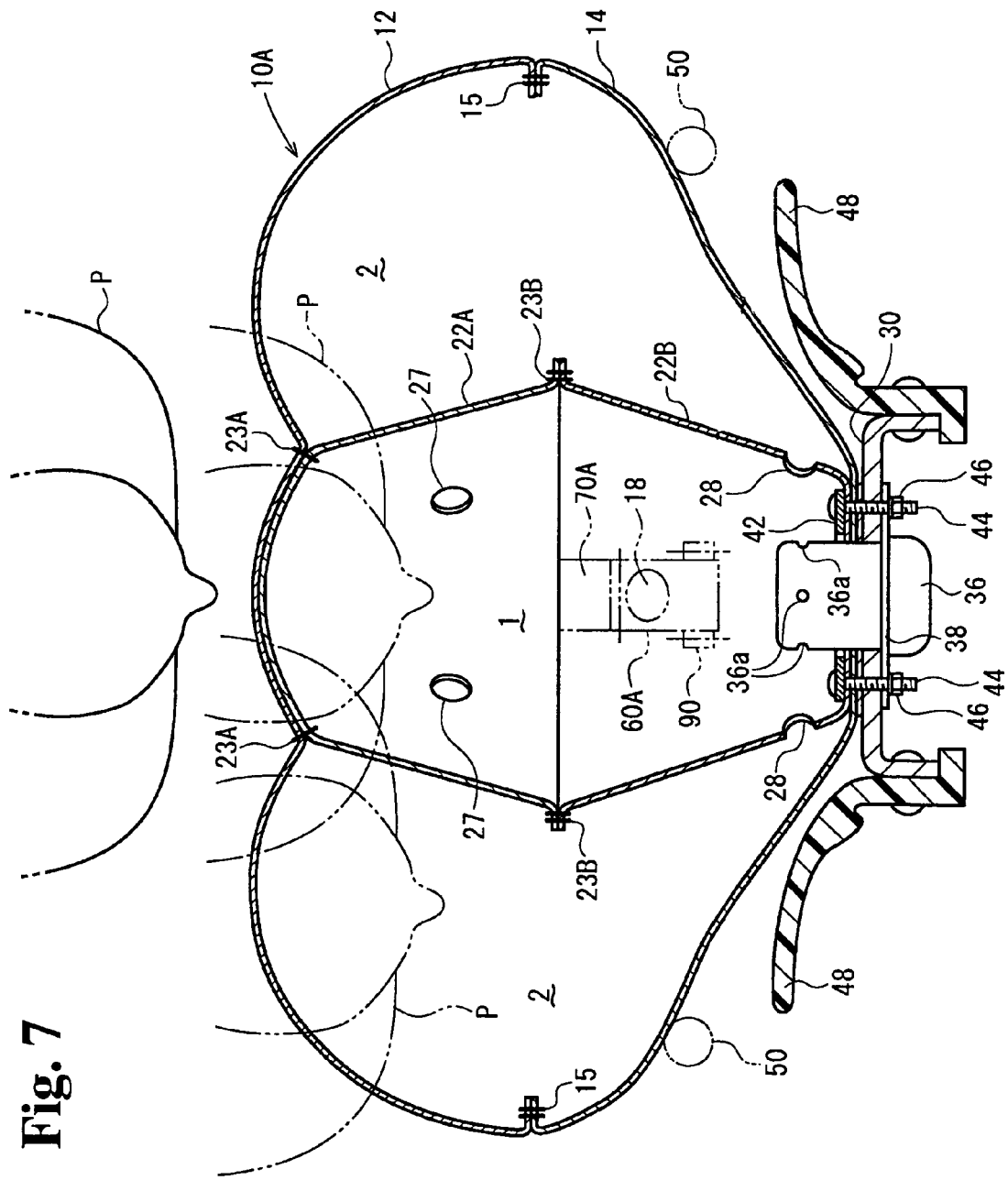
FIG. 7 is a cross-sectional view (horizontal cross-sectional view) taken along a line 7-7 in FIG. 6.
Figure 8:
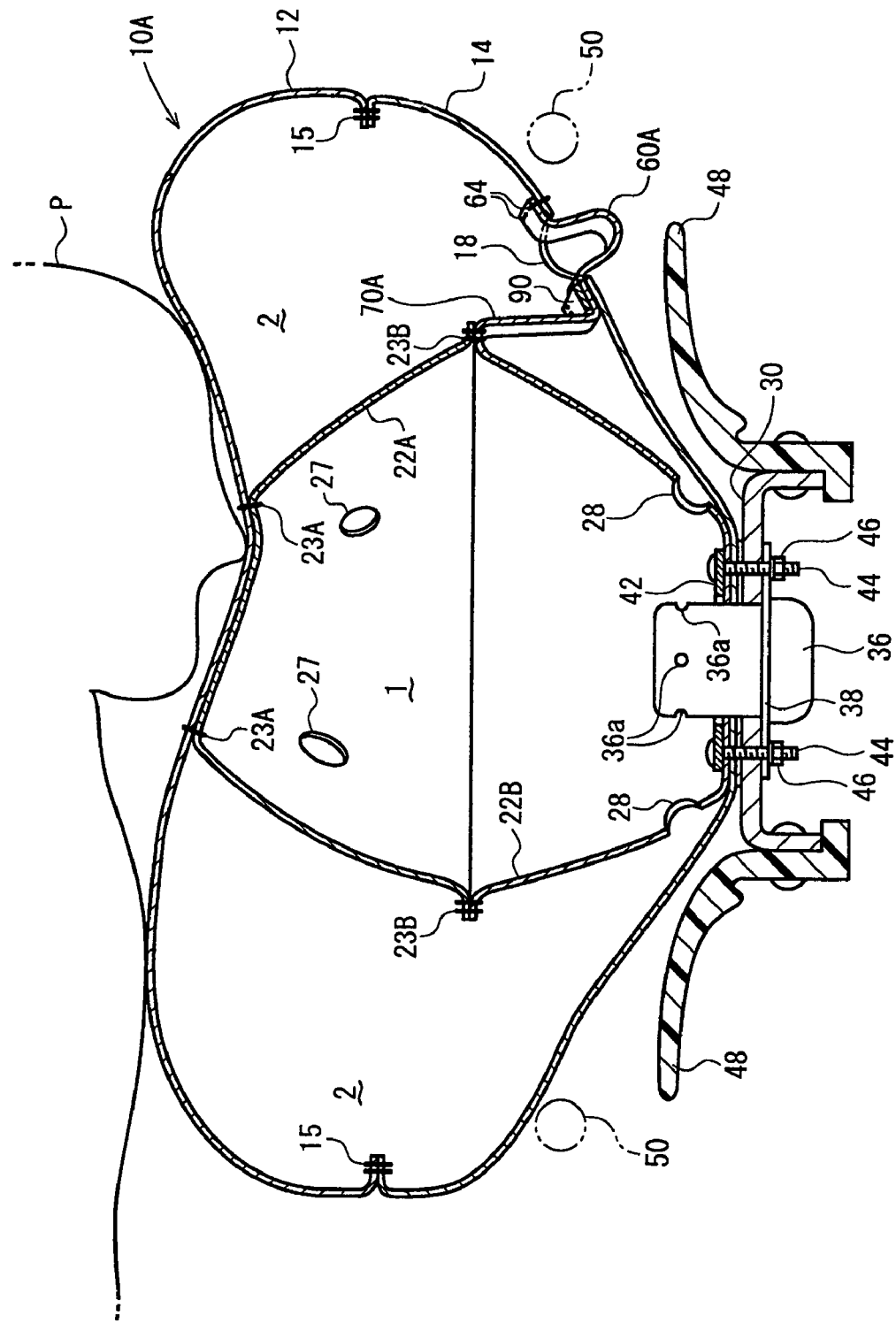
FIG. 8 is a longitudinal cross-sectional view illustrating the airbag and airbag apparatus of FIG. 6.
Figure 9:
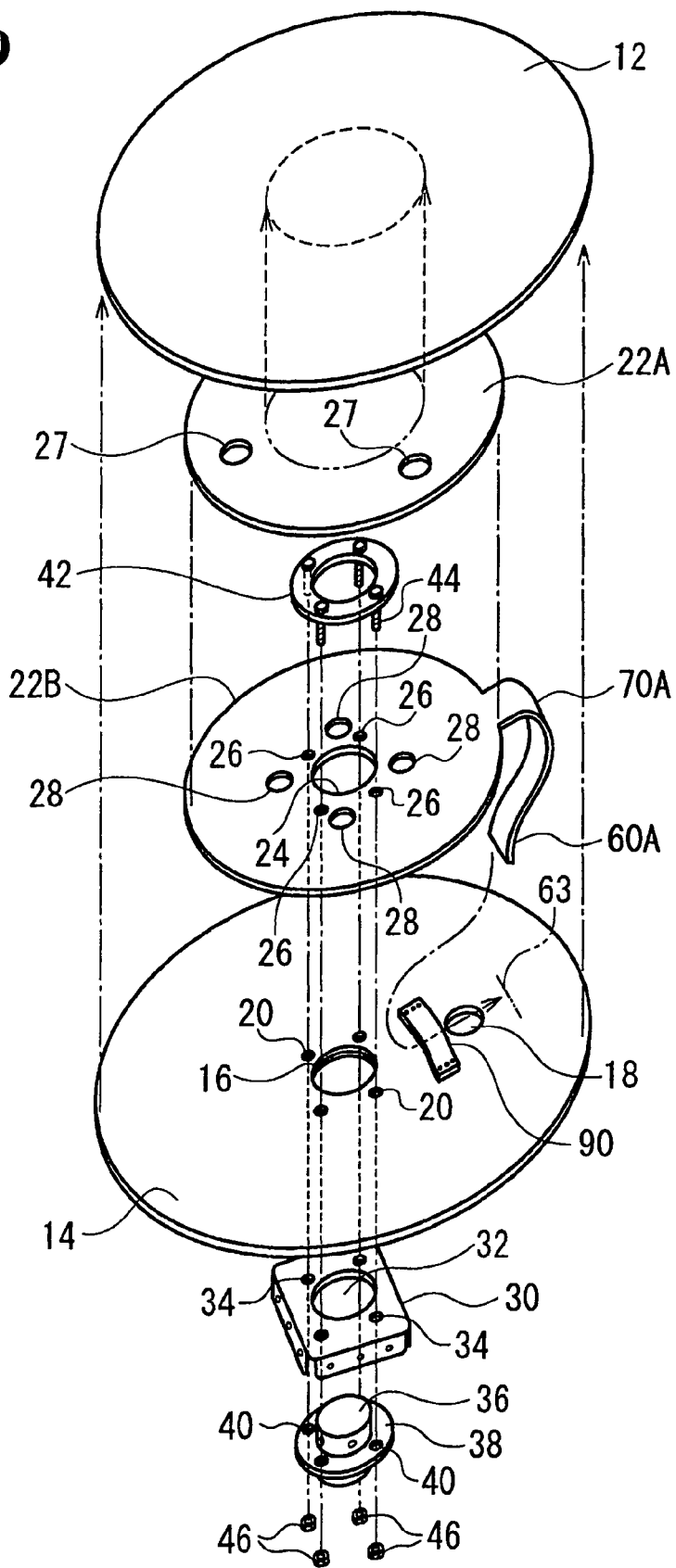
FIG. 9 is an exploded perspective view illustrating the airbag and the airbag apparatus of FIG. 6.

FIG. 6 is a longitudinal cross-sectional view illustrating an airbag and an airbag apparatus with respect to another embodiment, FIG. 7 is a cross-sectional view (horizontal cross-sectional view) taken along a line 7-7 of FIG. 6, FIG. 8 is a longitudinal cross-sectional view illustrating the airbag and the airbag apparatus, and FIG. 9 is an exploded perspective view illustrating the airbag and the airbag apparatus. Incidentally, FIG. 6 illustrates a state before the occupant contacts the expanded airbag, and FIG. 8 illustrates a state after the occupant contacts the expanded airbag.

An airbag 10A in this embodiment is also the airbag for use in the driver's seat, which is expanded in a manner so as to cover the steering wheel 50 of the vehicle.

The airbag 10A is provided with the front panel 12 constituting the occupant-facing surface, the rear panel 14 constituting a surface on a side opposite to the occupant, which is on a side opposite to the occupant-facing surface, each of first and second inner panels 22A and 22B serving as an inner member, which partitions an inside of the airbag 10A into a first chamber 1 and a second chamber 2, an open-and-close type venthole 18 that allows the second chamber 2 to communicate with an outside of the airbag 10A, a lid body 60A serving as a limiting member for limiting the discharge of the gas from the open-and-close type venthole 18, a tether 70A serving as a connecting member for coupling the lid body 60A with the inner panel 22B, and so forth.

In this embodiment, the lid body 60A is configured to cover the open-and-close type venthole 18 from an inside of the airbag 10A, and the lid body 60A and the inner panel 22B are coupled by means of the tether 70A in the inside of the airbag 10A. Accordingly, the constant-open type venthole 19 serving as the connecting member insertion hole of the above-described airbag 10 is not provided in this airbag 10A. However, although not illustrated, a constant-open type venthole other than the connecting member insertion hole may be provided.

In this embodiment, as illustrated in FIGS. 6 and 7, the open-and-close type venthole 18 is also disposed substantially on the centerline (not illustrated) extending in the upper-and-lower direction while passing through the center in the left and right direction of the rear panel 14 and at the upper side in relation to the opening 16 for use in the inflator at the center of the rear panel 14.

As illustrated in FIGS. 6 and 7, the lid body 60A extends in a manner so as to traverse the open-and-close type venthole 18 in a radius direction (namely, upper-and-lower direction) of the rear panel 14, and the tether 70A continues into the lid body 60A at a center side (base end side) of the rear panel 14. A tip end side of the lid body 60A is stitched to the rear panel 14 at a position situated near an outer peripheral side of the rear panel 14 in relation to the open-and-close type venthole 18 by means of the seam 64.

In this embodiment, as illustrated in FIG. 9, the lid body 60A is integrally constructed with the tether 70A. However, the lid body 60A and the tether 70A may be constructed in separate bodies, and one end of the tether 70A may be stitched to a base end side of the lid body 60A.

In this embodiment, an inserting portion 90 to which a portion on the way of the tether 70A is inserted is provided on an inside surface of the rear panel 14. As illustrated in FIG. 9, the inserting portion 90 is disposed at a position situated near a center side of the rear panel 14 in relation to the open-and-close type venthole 18 in this embodiment. In this embodiment, the inserting portion 90 is formed of a small cloth having an approximately rectangular shape. A pair of two side portions of the rectangular small cloth is stitched to the rear panel 14 by means of a seam 91. The tether 70 is laced through a gap formed between the small cloth and the rear panel 14 from a rest pair of two sides of the small cloth.

First and second inner panels 22A and 22B serving as inner members in this embodiment are formed of an approximately round-shaped woven cloth, respectively. The first and second inner panels 22A and 22B are disposed in an approximately concentric manner with the front panel 12 and the rear panel 14 in the airbag 10A. Each of the outer peripheral edge portions thereof is stitched by means of a tear seam 23B, and a center portion of the first inner panel 22A at a front panel 12 side (a portion to be a tip end side of the first inner panel 22A in a state that the airbag 10A is expanded) is stitched to a center portion of the front panel 12 by means of a seam 23A.

An inside of the airbag 10A is partitioned into the first chamber 1 at a center part and the second chamber 2 surrounding the first chamber 1 by means of the first and second inner panels 22A and 22B. The first chamber 1 is located inside the inner panels 22A and 22B.

At a center portion of the second inner panel 22B at the rear panel 14 side (a portion to be a rear end side of the second inner panel 22B in a state that the airbag 10A is expanded), an opening 24 for use in the inflator, which is disposed in an approximately concentric manner with the opening 16 for use in the inflator of the rear panel 14 is provided. Further, in a periphery of the opening 24 of the second inner panel 22B, bolt insertion holes 26 respectively overlapping with the bolt insertion holes 20 of the rear panel 14 are provided.

In the first and second inner panels 22A and 22B, continuous holes 27 and 28 for allowing the first chamber 1 and the second chamber 2 to communicate with each other are provided, respectively. In this embodiment, the continuous holes 27 are provided in the first inner panel 22A, and the continuous holes 28 are provided in an area which is relatively close to the opening 24 for use in the inflator in the second inner panel 22B. Incidentally, in this embodiment, the continuous holes 28 are disposed on an extension line of a gas-blowing out direction of the inflator 36, which is disposed in the first chamber 1 via the openings 16 and 24 for use in the inflator, namely in a manner so as to face the gas-blowing outlets 36a of the inflator 36. However, the number and the position of the continuous hole for communicating the first chamber 1 and the second chamber 2 are not limited thereto.

In this embodiment, the aforementioned tether 70A is integrally provided with the second inner panel 22B, and the other end thereof continues into an outer peripheral edge portion of an upper end side of the second inner panel 22B.

However, the tether 70A may be integrally provided with the first inner panel 22A, and may be provided as a separate body therefrom. Furthermore, the tether 70A may be coupled with a place other than the outer peripheral edge portion of each of the inner panels 22A or 22B.

Incidentally, a length of the tether 70A is configured to have a dimension, in which when the airbag 10A is expanded, the tether 70A is under tension by being pulled into the airbag 10A by means of the inner panels 22A and 22B, and thereby a movement of the lid body 60A toward the outside of the airbag 10A (i.e., to be pushed out of the airbag 10A from the open-and-close type venthole 18 by means of the gas pressure in the airbag 10A) is blocked. There is no possibility that the lid body 60A is floated up from an inside surface of the rear panel 14 by being excessively pulled into the inside of the airbag 10A by means of the tether 70A.

The construction of the airbag 10A other than that described above is the same as that of the airbag 10 in FIGS. 1 through 5 described above, and the same numerals in FIGS. 7 through 9 as those in FIGS. 1 through 5 denote the same components.

When the airbag 10A is attached to the retainer 30, a peripheral edge portion of the opening 24 for use in the inflator of the second inner panel 22B is overlapped with a peripheral edge portion of the opening 16 for use in the inflator of the rear panel 14, and is further overlapped with a peripheral edge portion of the inflator-attaching opening 32 of the retainer 30. In addition, the stud bolts 44 of the pressing ring 42 are inserted into the respective bolt insertion holes 26 of the second inner panel 22B, the bolt insertion holes 20 of the rear panel 14, the bolt insertion holes 34 of the retainer 30, and the bolt insertion holes 40 of the flange 38. Thereafter, a nut 46 is fastened onto each of the tip ends thereof, and thus the second inner panel 22B, the rear panel 14 and the inflator 36 are fixed to the retainer 30.

Consequently, the peripheral edge portion of the opening 24 for use in the inflator of the second inner panel 22B is continued into the peripheral edge portion of the opening 16 for use in the inflator of the rear panel 14, and each of the outer peripheral edge portions of the first and second inner panels 22A and 22B is continued thereinto, and the center portion of the first inner panel 22A continues to the front panel 12.

An operation of an airbag apparatus provided with the thus constructed airbag 10A is explained as follows.

In a similar manner as that in the above-described embodiment, at a time of a collision of a vehicle or the like, the inflator 36 is activated and the gas is blown out into the airbag 10A, and the airbag 10A is expanded by means of the gas. In addition, the airbag 10A pushes the module cover 48 to open, and is developed into the vehicle interior.

In this airbag 10A, firstly, the gas from the inflator 36 is supplied into the first chamber 1, and the first chamber 1 is expanded. At this moment, the first and second inner panels 22A and 22B are developed toward an occupant side along with the expanding operation of the first chamber 1, and the tether 70A is under tension by being pulled into the inside of the airbag 10A by means of the first and second inner panels 22A and 22B and starts to block the lid body 60A to move toward the outside of the airbag 10A. Thereby, the lid body 60A is brought to a state to be overlapped with the open-and-close type venthole 18 without being pushed out of the airbag 10A from the open-and-close type venthole 18 by means of the gas pressure in the airbag 10A, and the open-and-close type venthole 18 is closed. Thereafter, the gas flows into the second chamber 2 from the first chamber 1 through the continuous holes 27 and 28, and the second chamber 2 is expanded.

In this airbag 10A, since the first chamber 1 has a smaller capacity as compared to that of an entire airbag 10A, and is not allowed to directly communicate with the open-and-close type venthole 18, the same is extremely rapidly expanded. Accordingly, the tether 70A is under tension in an early time and the movement of the lid body 60A toward the outside of the airbag 10A is blocked. Thus, the open-and-close type venthole 18 is brought to a closed state. Consequently, the gas in the second chamber 2 is limited to be discharged toward the outside of the airbag 10A via the open-and-close type venthole 18, and the second chamber 2 is also rapidly brought to a high inner pressure state. As a result, the entire airbag 10A is expanded in an early time.

Incidentally, in this embodiment, since the continuous holes 28 allowing the first chamber 1 and the second chamber 2 to communicate with each other are disposed on an extension line of a gas-blowing out direction of the inflator 36, which is disposed in the first chamber 1, namely in a manner so as to face the gas-blowing outlets 36a of the inflator 36, respectively, when the inflator 36 is activated, the gas is blown out from the gas-blowing outlets 36a to the continuous holes 28, respectively. Accordingly, the gas from the inflator 36 easily flows into the second chamber 2 while passing through the continuous holes 28. Thereby, the expanding operation of the second chamber 2 is further accelerated.

Thereafter, in a case that the occupant P contacts the expanded airbag 10A, as illustrated in FIG. 8, the front panel 12 of the airbag 10A is pressed by the occupant P and retreated toward the rear panel 14 side, and the inner panels 22A and 22B are loosened. Therefore, the lid body 60A moves toward the outside of the airbag 10A by just the amount moved. Consequently, the lid body 60A is pushed out from the open-and-close type venthole 18 by means of the gas pressure in the airbag 10A, and the open-and-close type venthole 18 is opened. As a result, the gas is discharged from the open-and-close type venthole 18 toward the outside of the airbag 10A, and the occupant P is softly received by means of the airbag 10A.

In this airbag 10A, as illustrated in FIG. 7, since the inner panels 22A and 22B are also configured to couple the vicinity of the middle portion in the left and right direction of the front panel 12 with the rear panel 14 side, when the occupant P contacts the center portion, in the left and right direction, of the front panel 12 and causes the center portion to retreat toward the rear panel 14 side, a loosening amount of each of the inner panels 22A and 22B becomes largest. In contrast, in a case that the occupant P contacts the front panel 12 while being deviated from the center portion in the left and right direction thereof to the left side or the right side, as illustrated in FIG. 7, a retreating amount of the center portion, in the left and right direction, of the front panel 12 toward the rear panel 14 side becomes smaller as compared to the case that the occupant P directly contacts the center portion. Thereby, the loosening amount of the inner panels 22A and 22B becomes small. The more the position on the front panel 12, with which the occupant P contacts, is deviated to a left end side or a right end side of the front panel 12, the smaller the loosening amount of the inner panels 22A and 22B becomes.

Further, in this airbag 10A, when the occupant P contacts the center portion, in the left and right direction, of the front panel 12 and causes the center portion to retreat toward the rear panel 14 side, the inner panels 22A and 22B also start loosening in the earliest manner. Furthermore, the more the position on the front panel 12, with which the occupant P contacts, is deviated from the center portion toward the left end side or the right end side of the front panel 12, the later the timing when the inner panels 22A and 22B start loosening becomes.

In this airbag 10A, the opening amount of the open-and-close type venthole 18 (i.e., a length in which the lid body 60A is pushed toward the outside of the airbag 10A while passing through the open-and-close type venthole 18) also increases or decreases in proportional to the loosening amount of the inner panels 22A and 22B. Accordingly, the opening amount of the open-and-close type venthole 18 becomes largest when the occupant P contacts the center portion, in the left and right direction, of the front panel 12 of the expanded airbag 10A, and the more the position on the front panel 12, with which the occupant P comes in contact, is deviated to the left end side or the right end side of the front panel 12, the smaller the opening amount of the open-and-close type venthole 18 becomes. Moreover, the opening timing of the open-and-close type venthole 18 depends on the timing when the inner panels 22A and 22B start loosening. Accordingly, the open-and-close type venthole 18 opens in the earliest manner when the occupant P contacts the center portion, in the left and right direction, of the front panel 12, and the more the position on the front panel 12, with which the occupant P contacts, is deviated to the left end side or the right end side of the front panel 12, the later the opening timing of the open-and-close type venthole 18 becomes.

Accordingly, in this airbag 10A, it is also possible to sufficiently discharge the gas to the outside of the airbag 10A from the open-and-close type venthole 18 when the occupant P contacts the center portion, in the left and right direction, of the front panel 12 of the expanded airbag 10A, and to suppress the discharge of the gas to the outside of the airbag 10A when the occupant P contacts the left end side or the right end side in the manner deviated from the center portion, in the left and right direction, of the front panel 12.

In addition, in this airbag 10A, it is also possible to rapidly discharge the gas from the open-and-close type venthole 18 when the occupant P contacts the center portion, in the left and right direction, of the front panel 12 of the expanded airbag 10A, and to sufficiently receive the occupant P by means of delaying the opening timing of the open-and-close type venthole 18 when the occupant P contacts the left end side or the right end side of the front panel 12 in the deviated manner.

Incidentally, as illustrated in FIGS. 6 and 8, the airbag 10A is also expanded to have a shape in which the more the position on the airbag 10A approaches an outer peripheral side thereof, the smaller the thickness becomes. However, in this airbag 10A, as described above, the more the position on the front panel 12, with which the occupant P contacts, is deviated to the left end side or the right end side of the front panel 12, the smaller the opening amount of the open-and-close type venthole 18 becomes as well. Thereby, the discharge of the gas to the outside of the airbag 10A is suppressed, and the opening timing of the open-and-close type venthole 18 is delayed. As a result, even when the occupant P contacts the left end side or the right end side of the front panel 12 in the deviated manner, there is no possibility that the front panel 12 collides with a bottom of the airbag 10A, and the occupant P can sufficiently be received by means of the airbag 10A.

Figure 10:
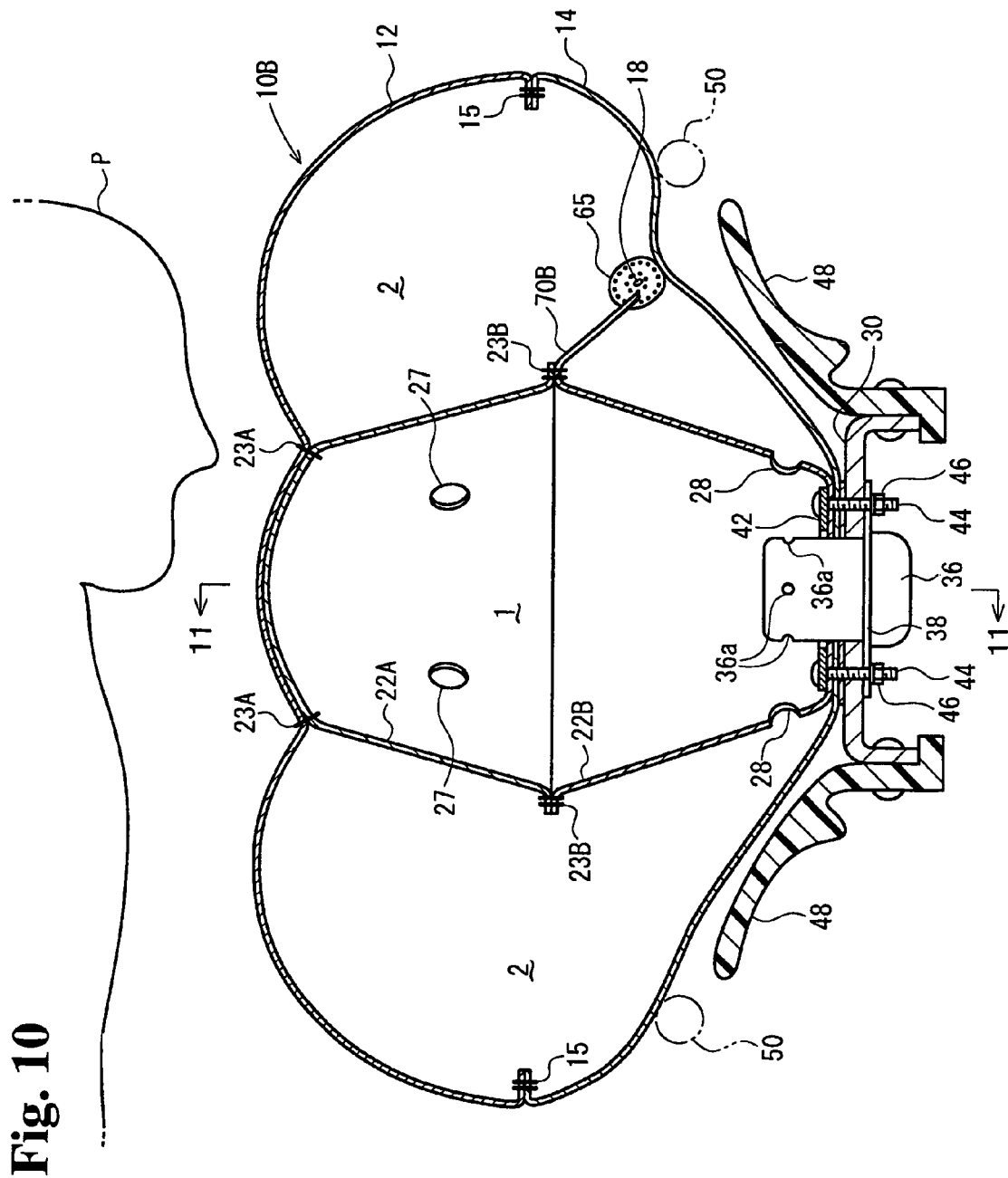
FIG. 10 is a longitudinal cross-sectional view illustrating an airbag and an airbag apparatus with respect to an embodiment.
Figure 11:
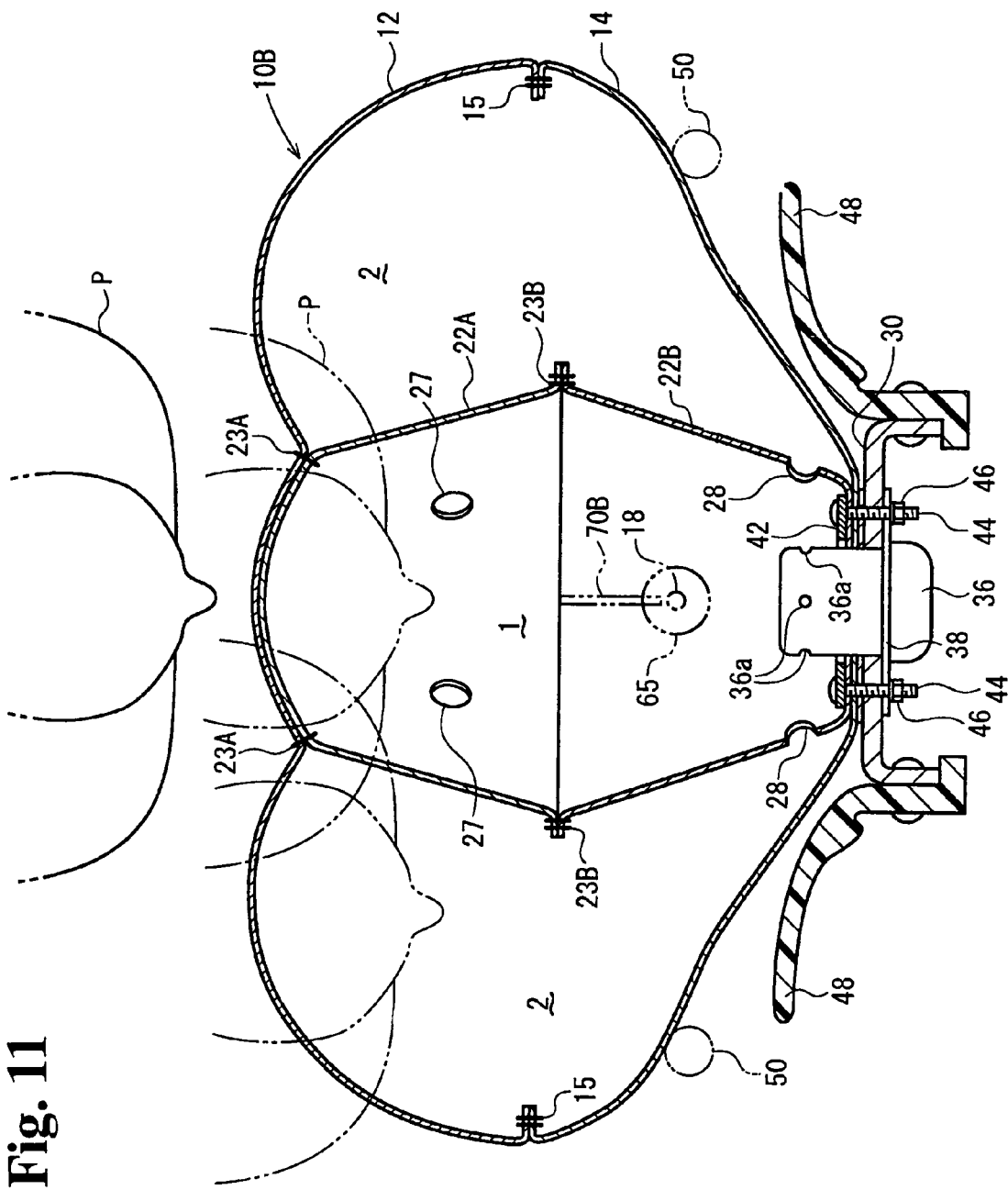
FIG. 11 is a cross-sectional view (horizontal cross-sectional view) taken along a line 11-11 in FIG. 10.
Figure 12:
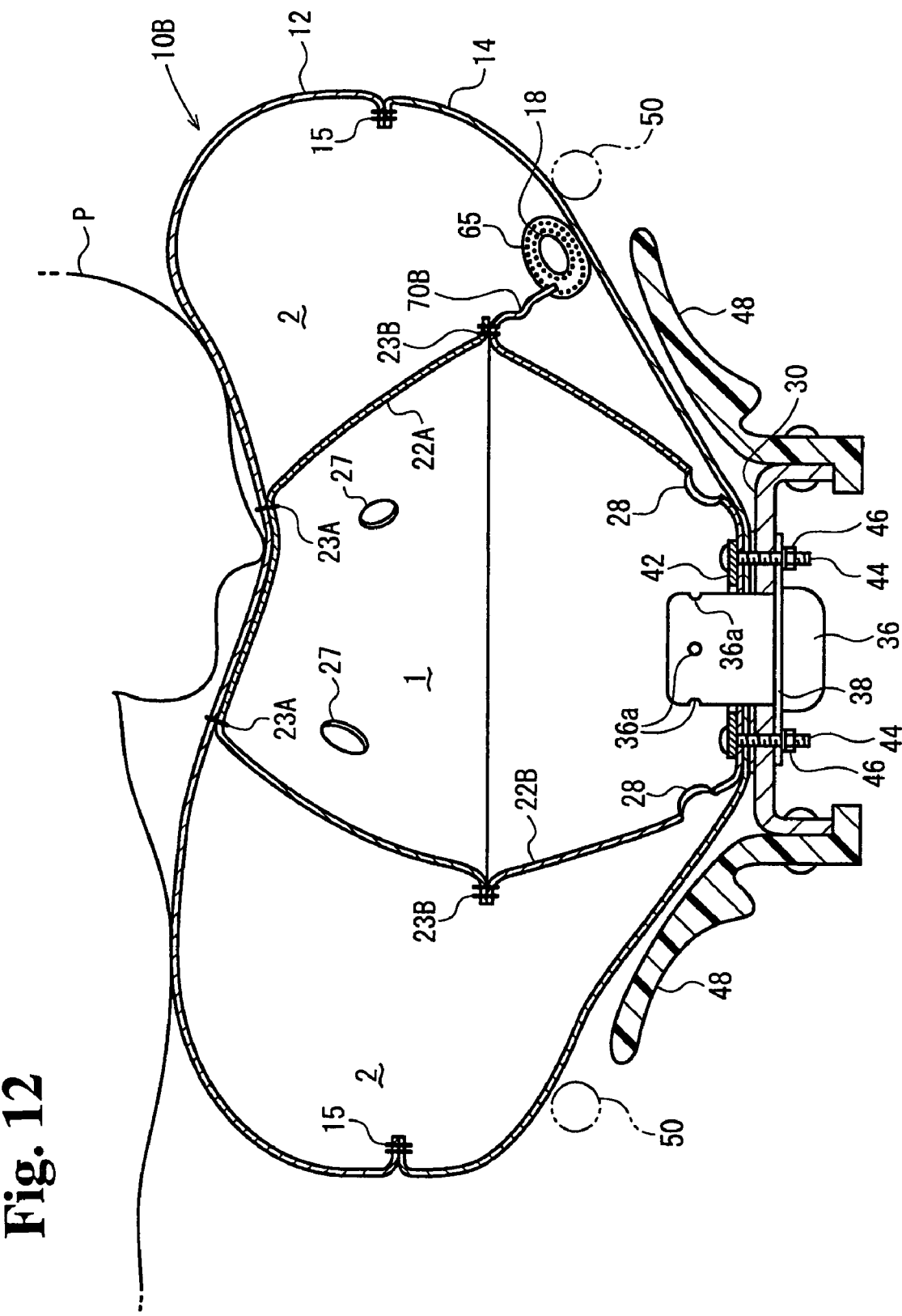
FIG. 12 is a longitudinal cross-sectional view illustrating the airbag and the airbag apparatus of FIG. 10.
Figure 13:
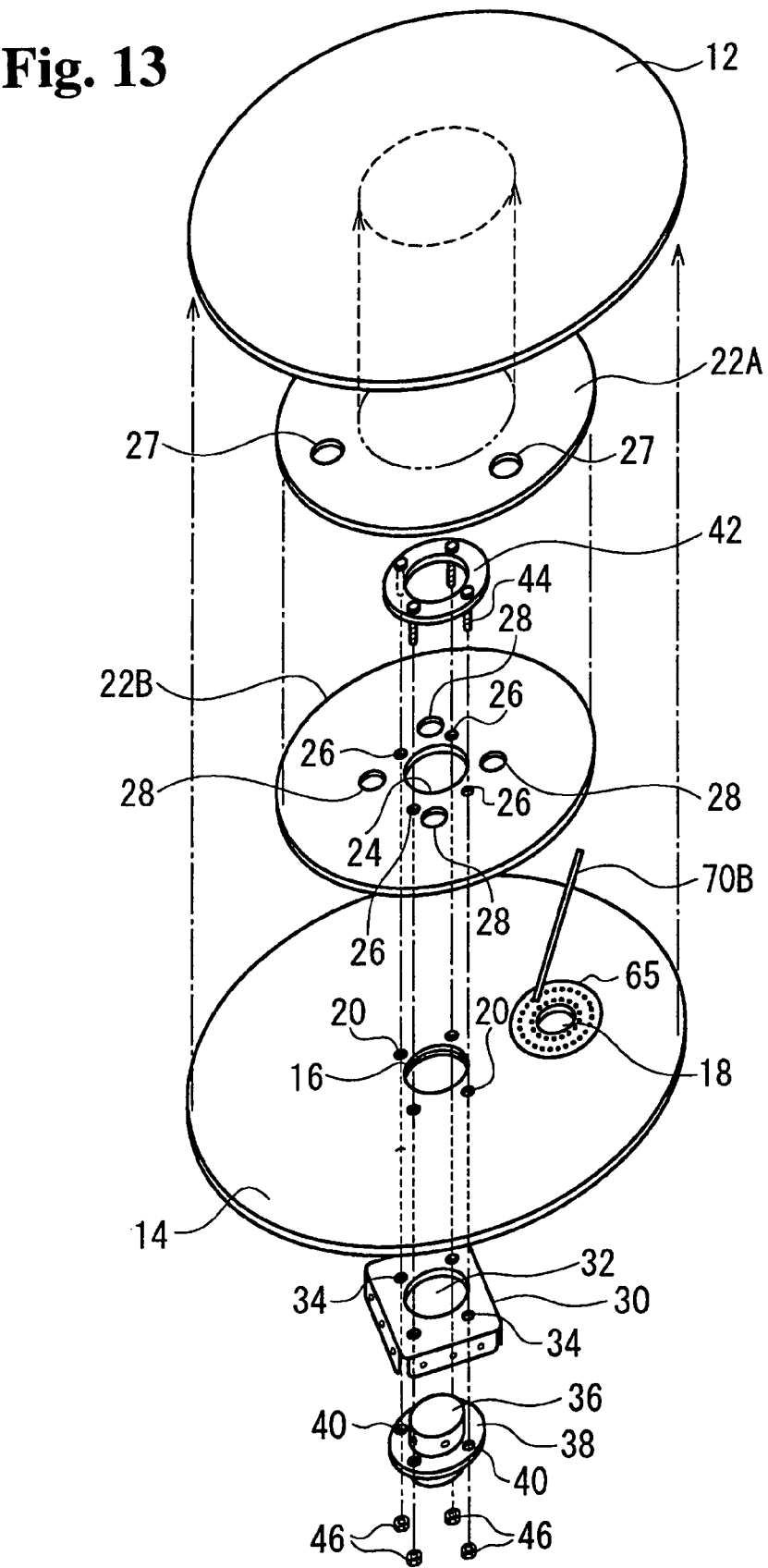
FIG. 13 is an exploded perspective view illustrating the airbag and the airbag apparatus of FIG. 10.
Figure 14A:
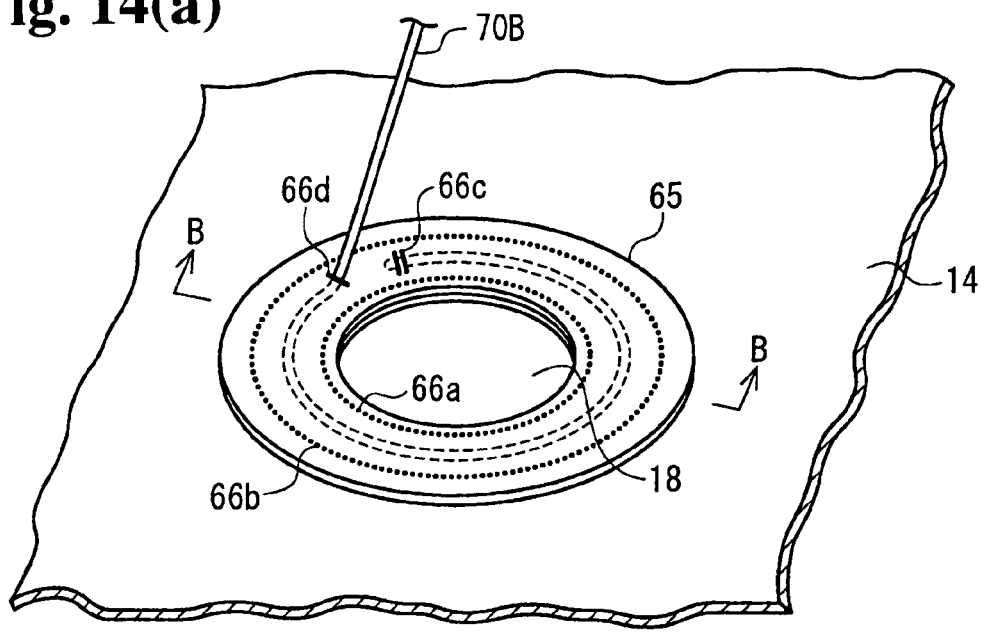
FIGS. 14(a)-14(c) are construction diagrams in the vicinity of an open-and-close type venthole of the airbag of FIG. 10.
Figure 14B:
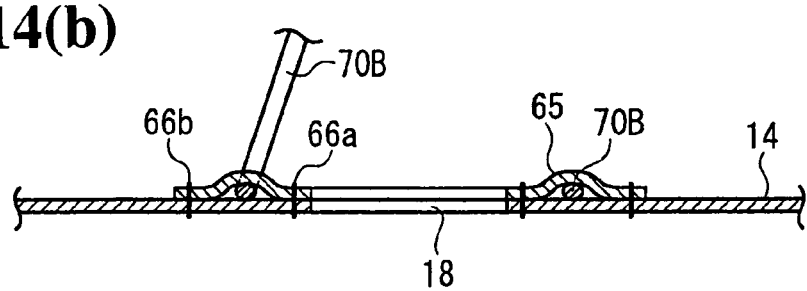
Figure 14C:
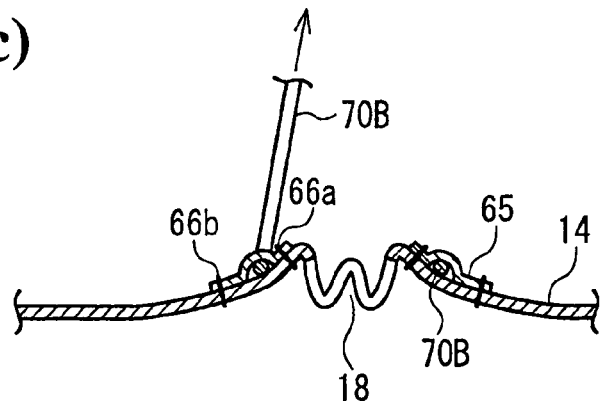

FIG. 10 is a longitudinal cross-sectional view illustrating an airbag and an airbag apparatus with respect to still another embodiment, FIG. 11 is a cross-sectional view (horizontal cross-sectional view) taken along a line 11-11 of FIG. 10, FIG. 12 is a longitudinal cross-sectional view illustrating the airbag and the airbag apparatus, FIG. 13 is an exploded perspective view illustrating the airbag and the airbag apparatus, FIG. 14(a) is a perspective view illustrating the vicinity of an open-and-close type venthole of the airbag, FIG. 14(b) is a cross-sectional view taken along a line 14(b, c)-14(b, c) of FIG. 14(a), and FIG. 14(c) is a cross-sectional view illustrating the same part as that of FIG. 14(b) when the open-and-close type venthole is closed (including a state when an opening amount thereof is small). Incidentally, FIG. 10 illustrates a state before an occupant contacts the expanded airbag, and FIG. 12 illustrates a state after the occupant contacts the expanded airbag. FIGS. 14(a) and (b) illustrate a state when the open-and-close type venthole is opened (including a state when the opening amount thereof is large).

In this embodiment, an airbag 10B is also an airbag for use in the driver's seat, which is expanded in a manner so as to cover the steering wheel 50 of a vehicle.

In this airbag 10B of this embodiment, a binding member capable of binding the open-and-close type venthole 18 by being pulled into the inside of the airbag 10B is provided to serve as a limiting member. Incidentally, in this embodiment, a tether 70B as a connecting member serves as the binding member. Hereinbelow, a construction of the binding member will be explained.

In this embodiment, as illustrated in FIGS. 10 and 11, the open-and-close type venthole 18 is also disposed substantially on a centerline (not illustrated) extending in an upper-and-lower direction while passing through a center in the left and right direction of the rear panel 14 and at an upper side in relation to the opening 16 for use in the inflator at the center of the rear panel 14.

A circular-ring shaped patch cloth 65 is fitted to the open-and-close type venthole 18 from an inside of the airbag 10B, and an inner peripheral edge of the patch cloth 65 is stitched to the rear panel 14 by means of a seam 66a, and an outer peripheral edge thereof is stitched to the rear panel 14 by means of the seam 66b.

A tunnel-shaped passageway is provided between the patch cloth 65 and the rear panel 14 between the seams 66a and 66b. This passageway surrounds the open-and-close type venthole 18.

One end side of the tether 70B is inserted into the passageway via a small hole 66c provided in the patch cloth 65. The one end of the tether 70B is stitched to the rear panel 14 and the patch cloth 65a by means of the seam 66d.

In this embodiment, first and second inner panels 22A and 22B that partition the inside of the airbag 10B into a first chamber 1 at a center, and a second chamber 2 surrounding the first chamber 1 are also provided as inner members in the inside of the airbag 10B. A construction and a disposition of the first and second inner panels 22A and 22B are the same as that of the airbag 10B in FIGS. 6 through 9 described above. That is, the first and second inner panels 22A and 22B couple the center portion of the front panel 12 of the airbag 10B with the rear panel 14 side.

In this embodiment, the other end of the tether 70B is stitched to the outer peripheral edge portion of the upper end side of the second inner panel 22B by means of a seam (illustration is omitted).

However, the other end of the tether 70B may be stitched to the outer peripheral edge portion of the upper end side of the first inner panel 22A, or alternatively, the same may be stitched to a place other than the outer peripheral edge portion of each of the first and second inner panels 22A and 22B. Further, the tether 70B may be integrally constructed with the first inner panel 22A or the second inner panel 22B.

The construction of the airbag 10B other than above-described is the same as that of the airbag 10A in FIGS. 6 through 9 described above, and the same numerals in FIGS. 10 through 13 as those in FIGS. 6 through 9 denote the same components therein.

An operation of an airbag apparatus provided with the thus constructed airbag 10B is explained as follows.

At a time of a collision of a vehicle or the like, the inflator 36 is activated and the gas is blown out into the airbag 10B, and the airbag 10B is expanded by means of the gas. Further, the airbag 10B pushes to open the module cover 48, and is developed into the vehicle interior.

In this airbag 10B, the gas from the inflator 36 is also supplied into the first chamber 1 first, and the first chamber 1 is expanded. At this moment, the first and second inner panels 22A and 22B are expanded toward the occupant side along with the expanding operation of the first chamber 1, and the tether 70B is pulled into the inside of the airbag 10B by means of the inner panels 22A and 22B. Thereby, the open-and-close type venthole 18 is bound in a narrowing manner as illustrated in FIG. 10 and FIG. 14(c) resulting in reducing the opening amount of the open-and-close type venthole 18. Then, the gas flows into the second chamber 2 from the first chamber 1 via the continuous holes 27 and 28, and the second chamber 2 is expanded.

In this airbag 10B, since the first chamber 1 also has a smaller capacity as compared to that of an entire airbag 10B, and is not allowed to directly communicate with the open-and-close type venthole 18, the same is extremely rapidly expanded. Accordingly, the tether 70B is pulled into the inside of the airbag 10B in an early time and the opening amount of the open-and-close type venthole 18 is reduced. Consequently, the gas in the second chamber 2 is limited to be discharged toward the outside of the airbag 10B via the open-and-close type venthole 18, and the second chamber 2 is also rapidly brought to a high inner pressure state. As a result, the entire airbag 10B is expanded in an early time.

Incidentally, in this embodiment, similar to the airbag 10A in FIGS. 6 through 9 described above, since the continuous holes 28 allowing the first chamber 1 and the second chamber 2 to communicate with each other are also disposed on an extension line of a gas-blowing out direction of the inflator 36, which is disposed in the first chamber 1, namely in a manner so as to face the gas-blowing outlets 36a of the inflator 36, respectively, when the inflator 36 is activated, the gas is blown out from the gas-blowing outlets 36a to the continuous holes 28, respectively. Accordingly, the gas from the inflator 36 easily flows into the second chamber 2 while passing through the continuous holes 28. Thereby, the expanding operation of the second chamber 2 is further accelerated.

Thereafter, in a case that the occupant P contacts the expanded airbag 10B, as illustrated in FIG. 12, the front panel 12 of the airbag 10B is pressed by the occupant P and retreated toward the rear panel 14 side, and the inner panels 22A and 22B are loosened. Then, the pulling force that pulls the tether 70B into the inside of the airbag 10B is released. Consequently, the tether 70B is loosened and the opening amount of the open-and-close type venthole 18 is increased, as illustrated in FIG. 12 and FIGS. 14(a) and (b). As a result, the gas is discharged from the open-and-close type venthole 18 toward the outside of the airbag 10B, and the occupant P is softly received by means of the airbag 10B.

In this airbag 10B, as illustrated in FIG. 11, since the inner panels 22A and 22B are also configured to couple the vicinity of the middle portion in the left and right direction of the front panel 12 with the rear panel 14 side, when the occupant P contacts the center portion, in the left and right direction, of the front panel 12 and causes the center portion to retreat toward the rear panel 14 side, the loosening amount of each of the inner panels 22A and 22B becomes largest. In contrast, in a case that the occupant P contacts the front panel 12 while being deviated from the center portion in the left and right direction thereof to the left side or the right side, as illustrated in FIG. 11, a retreating amount of the center portion, in the left and right direction, of the front panel 12 to the rear panel 14 side becomes smaller as compared to the case that the occupant P directly contacts the center portion. Thereby, the loosening amount of the inner panels 22A and 22B also becomes small. The more the position on the front panel 12, with which the occupant P contacts, is deviated to a left end side or a right end side of the front panel 12, the smaller the loosening amount of the inner panels 22A and 22B becomes.

Further, in this airbag 10B, when the occupant P contacts the center portion, in the left and right direction, of the front panel 12 and causes the center portion to retreat toward the rear panel 14 side, the inner panels 22A and 22B also start loosening in the earliest manner. Furthermore, the more the position on the front panel 12, with which the occupant P contacts, is deviated from the center portion to the left end side or the right end side of the front panel 12, the later the timing when the inner panels 22A and 22B start loosening becomes.

In this airbag 10B, the opening amount of the open-and-close type venthole 18 (i.e., the length of a part of the tether 70B which is pulled into the tunnel-shaped passageway between the aforementioned patch cloth 65 and the rear panel 14) also increases or decreases in proportional to the loosening amount of the inner panels 22A and 22B. Accordingly, the opening amount of the open-and-close type venthole 18 becomes largest when the occupant P contacts the center portion, in the left and right direction, of the front panel 12 of the expanded airbag 10B, and the more the position on the front panel 12, with which the occupant P contacts, is deviated to the left end side or the right end side of the front panel 12, the smaller the opening amount of the open-and-close type venthole 18 becomes.

Moreover, the opening timing of the open-and-close type venthole 18 depends on the timing when the inner panels 22A and 22B start loosening. Accordingly, the open-and-close type venthole 18 opens in the earliest manner when the occupant P contacts the center portion, in the left and right direction, of the front panel 12, and the more the position on the front panel 12, with which the occupant P contacts, is deviated to the left end side or the right end side of the front panel 12, the later the opening timing of the open-and-close type venthole 18 becomes.

Accordingly, in this airbag 10B, it is also possible to sufficiently discharge the gas to the outside of the airbag 10B from the open-and-close type venthole 18 when the occupant P contacts the center portion, in the left and right direction, of the front panel 12 of the expanded airbag 10B, and to suppress the discharge of the gas to the outside of the airbag 10B when the occupant P contacts the left end side or the right end side in the manner deviated from the center portion, in the left and right direction, of the front panel 12.

Further, in this airbag 10B, it is also possible to rapidly discharge the gas from the open-and-close type venthole 18 when the occupant P contacts the center portion, in the left and right direction, of the front panel 12 of the expanded airbag 10B, and to sufficiently receive the occupant P by means of delaying the opening timing of the open-and-close type venthole 18 when the occupant P contacts the left end side or the right end side of the front panel 12 in the deviated manner.

Incidentally, as illustrated in FIGS. 10 and 14, the airbag 10B is also expanded to have a shape in which the more the position on the airbag 10B approaches an outer peripheral side thereof, the smaller the thickness becomes. However, in this airbag 10B, as described above, the more the position on the front panel 12, with which the occupant P contacts, is deviated to the left end side or the right end side of the front panel 12, the smaller the opening amount of the open-and-close type venthole 18 becomes as well. Thereby, the discharge of the gas to the outside of the airbag 10B is suppressed, and the opening timing of the open-and-close type venthole 18 is delayed. As a result, even when the occupant P contacts the left end side or the right end side of the front panel 12 in the deviated manner, there is no possibility that the front panel 12 collides with the bottom of the airbag 10B, and the occupant P can sufficiently be received by means of the airbag 10B.

Figure 15:
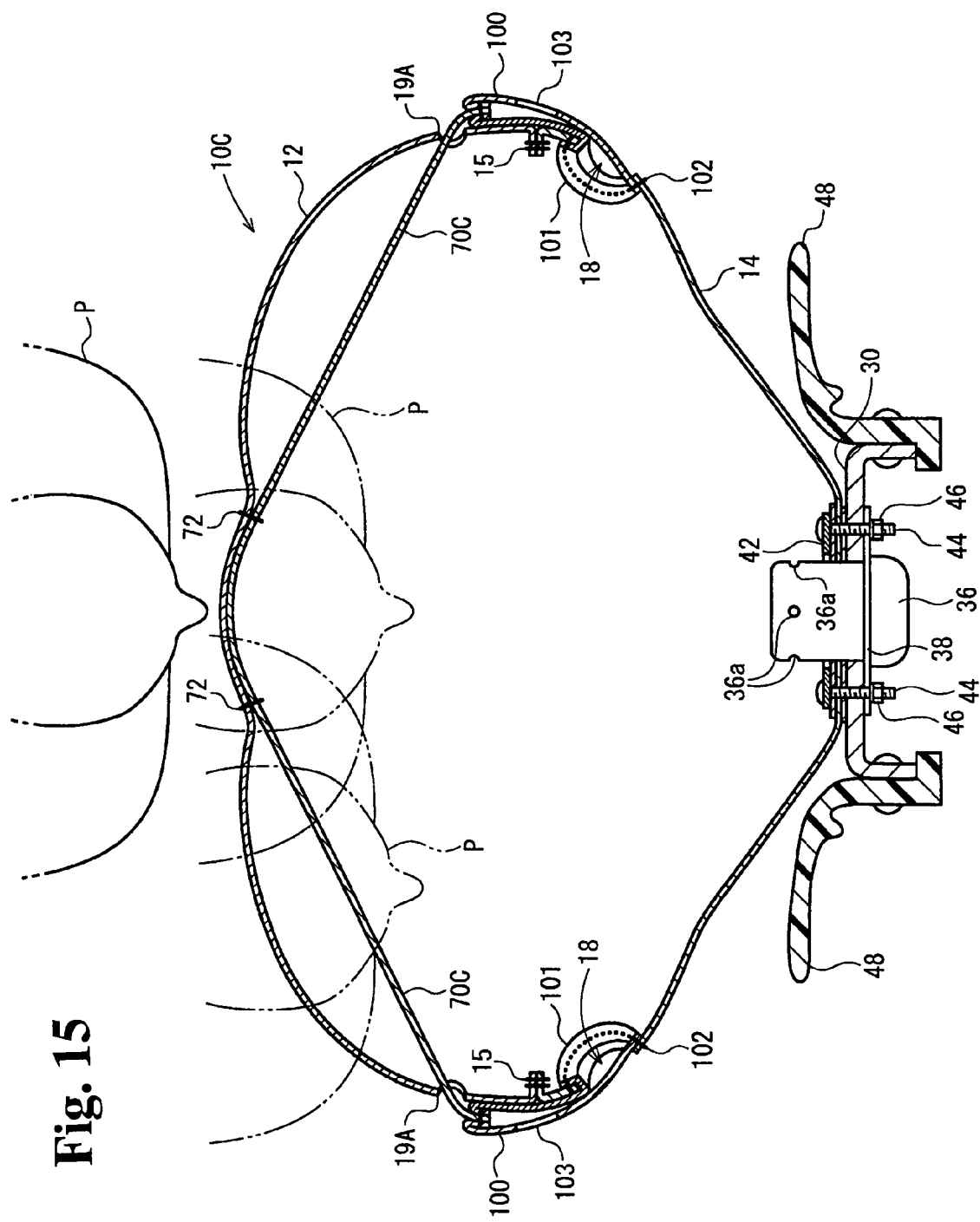
FIG. 15 is a horizontal cross-sectional view illustrating an airbag and an airbag apparatus with respect to an embodiment.
Figure 16:
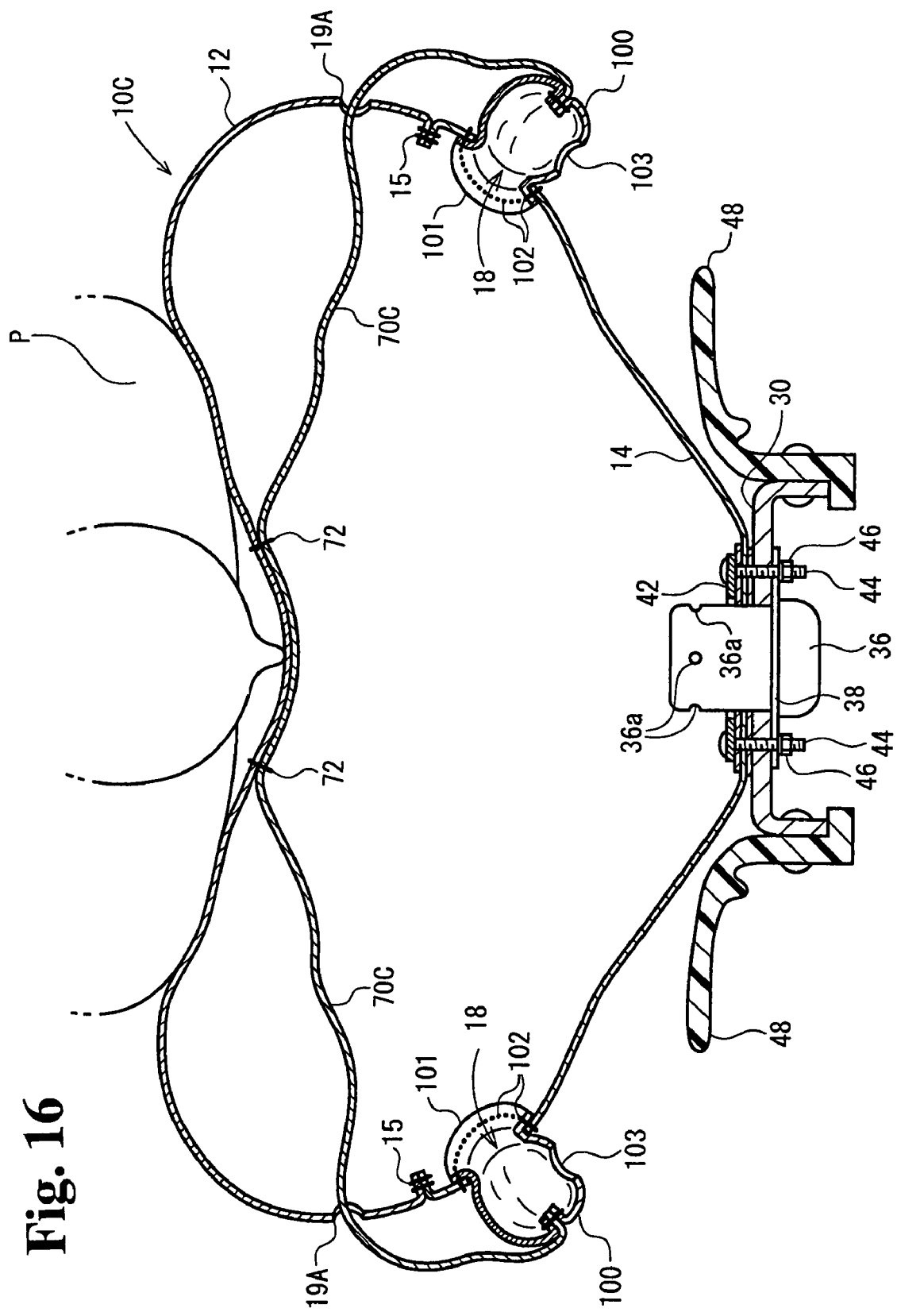
FIG. 16 is a horizontal cross-sectional view illustrating the airbag and the airbag apparatus of FIG. 15.
Figure 17A:
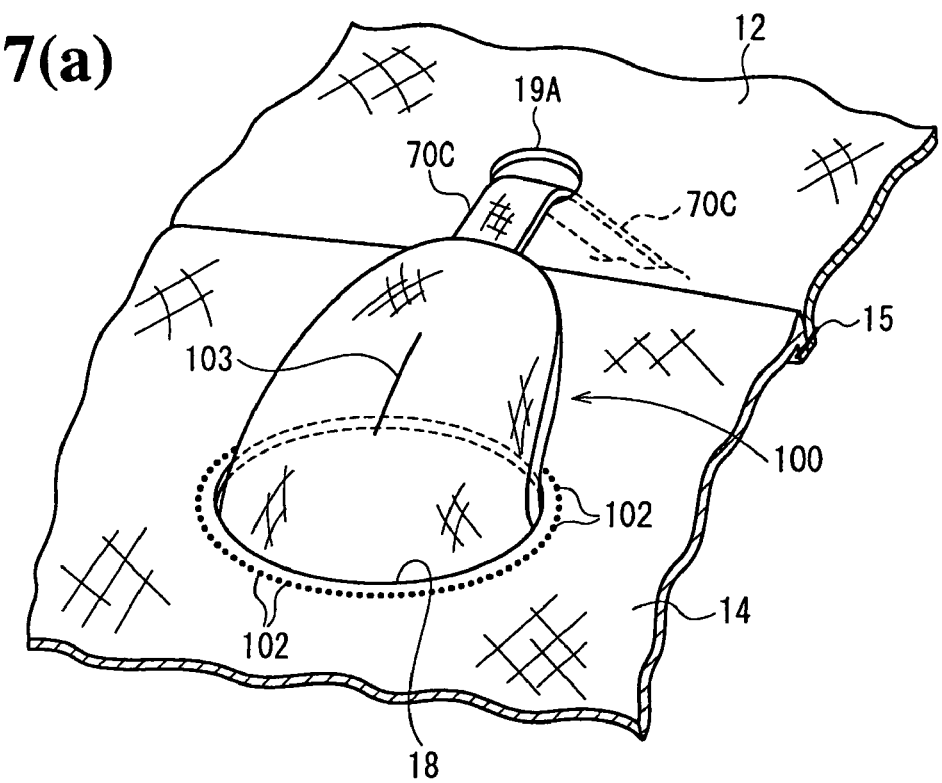
FIGS. 17(a) and 17(b) are perspective views illustrating a small bag body of the airbag of FIG. 15.
Figure 17B:
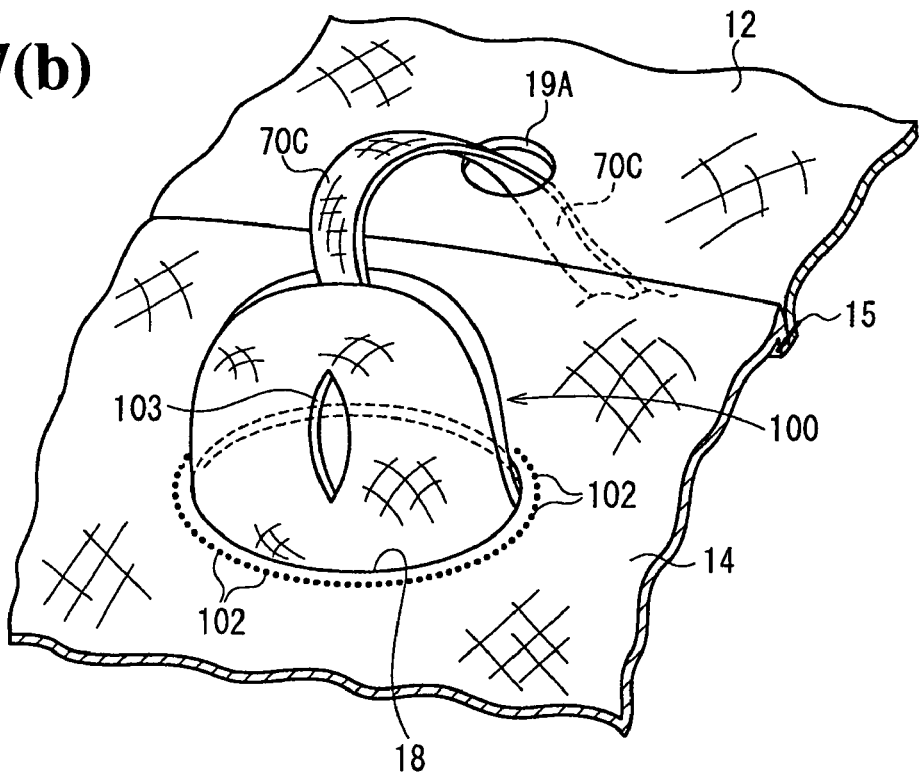

FIG. 15 and FIG. 16 are horizontal cross-sectional views illustrating an airbag and an airbag apparatus with respect to still another embodiment, FIG. 17(a) is a perspective view illustrating a small bag body when an open-and-close type venthole is closed (including a state when an opening amount thereof is small), and FIG. 17(b) is a perspective view illustrating the small bag body when the open-and-close type venthole is opened (including a state when the opening amount thereof is large). Incidentally, FIG. 15 illustrates a state before an occupant contacts the expanded airbag, and FIG. 16 illustrates a state after the occupant contacts the expanded airbag.

In this embodiment, an airbag 10C is also an airbag for use in the driver's seat, which is expanded in a manner so as to cover the steering wheel 50 of the vehicle.

This airbag 10C is provided with the front panel 12 constituting the occupant-facing surface, the rear panel 14 constituting an outer surface on a side opposite to the occupant-facing surface of the airbag, ventholes 18 and 19A that allow the inside and outside of the airbag 10 to communicate with each other, a small bag body 100 serving as a limiting member that limits the discharge of the gas from the venthole 18, a tether 70C serving as a connecting member that couples the small bag body 100 with the front panel 12 via the venthole 19A, and so forth.

In this embodiment, the internal members such as the hanging strap 80, and the inner panels 22A and 22B, and so forth, which couple the front panel 12 with the rear panel 14 in an inside of the airbag 10C are omitted. However, in this embodiment, these internal members may also be provided.

In this airbag 10C, the venthole 18 is also the open-and-close type venthole, and the venthole 19A is also the constant-open type venthole serving as the connecting-member insertion hole.

In this embodiment, the open-and-close type ventholes 18 are respectively provided in the vicinity of outer peripheral edges on both of the left and right end sides of the rear panel 14, and the small bag bodies 100 are respectively attached to the open-and-close type ventholes 18. Each of the open-and-close type ventholes 18 is formed of an opening having the same shape and the same size. Further, the open-and-close type ventholes 18 are disposed in a substantially symmetrical positional relationship while passing through the center in the left and right direction of the rear panel 14, and sandwiching a center line (not illustrated) extending in an upper and lower direction thereof.

Incidentally, the "substantially symmetrical" means the fact that the open-and-close type ventholes 18 on the left and right may not perfectly be disposed in the symmetrical positional relationship, and a slight difference (within an area of about ±50 mm) may be applicable between a distance from the aforementioned center line of the airbag 10C to the left side open-and-close type venthole 18 and a distance from that to the right side open-and-close type venthole 18, and further, each of the left and right open-and-close type ventholes 18 may be slightly (within an area of about ±50 mm) deviated in the upper and lower direction.

Furthermore, in this embodiment, each of the constant-open type ventholes 19A is provided in the vicinity of the outer peripheral edge of the left and right end sides of the front panel 12. These constant-open type ventholes 19A are disposed at positions that are spaced apart from the left and right open-and-close type ventholes 18 to the occupant side by the same distance, respectively, in a state that the airbag 10C is expanded. Moreover, the right side open-and-close type venthole 18 and each of the constant-open type ventholes 19A, and the left side open-and-close type venthole 18 and each of the constant-open type venthole 19A are respectively disposed in positions of an approximately the same phase in a peripheral direction of the front panel 12 and the rear panel 14. Incidentally, each of the constant-open type ventholes 19A is also formed of an opening of the same shape and the same size.

Incidentally, the positions of the open-and-close type venthole 18 and the constant-open type venthole 19A are not limited thereto, and for example, both of the same may be disposed at one of the front panel 12 or the rear panel 14.

In this embodiment, a middle portion in a longitudinal direction of the tether 70C is disposed in the airbag 10C, and a middle portion of the tether 70C is stitched to a center portion of the front panel 12 by means of a seam 72 while taking a posture in which the longitudinal direction thereof conforms to the left and right direction of the front panel 12. The length from the seam 72 to one end of the tether 70C, and the length from the same 72 to the other end thereof are formed to be approximately equal. The one end side and the other end side of the tether 70C are respectively pulled outside the airbag 10C through the left and right constant-open type ventholes 19A.

Each of the small bag bodies 100 are formed of a bag body having a smaller capacity than that of the airbag 10C.

Each of the small bag bodies 100 is disposed on the outside of the airbag 10C, respectively. Each of the small bag bodies 100 is provided with a gas-flowing inlet 101 on one end (base end) side thereof, and a peripheral edge portion of the gas-flowing inlet 101 is stitched to a peripheral edge portion of each of the open-and-close type ventholes 18 by means of a seam 102 across an entire periphery. Incidentally, in this embodiment, the one end side of each of the small bag bodies 100 is inserted into the airbag 10C from each of the open-and-close type venthole 18, and the peripheral edge portion of each of the gas-flowing inlet 101 is overlapped with the peripheral edge portion of each of the open-and-close type ventholes 18 from the inside of the airbag 10C, and stitched by means of the seam 102. However, the peripheral edge portion of the gas-flowing inlet 101 may be stitched upon being overlapped with the peripheral edge portion of each of the open-and-close type venthole 18 from the outside of the airbag 10C.

One end side and the other end side of the tether 70C that are respectively pulled out from the left and right constant-open type ventholes 19A to the outside of the airbag 10C, are respectively stitched to the other end (tip end) side (namely, a portion that is most spaced apart from the gas-flowing inlet 101 in each of the small bag bodies 100, or the vicinity) of the left and right small bag bodies 100 by means of a seam (illustration is omitted).

At a side surface between a tip end side and a base end side of each of the small bag bodies 100 (in this embodiment, a surface that faces the outside of the airbag 10C when the small bag bodies 100 are overlapped with an outer surface of the airbag 10C upon stretching the tip end side of each of the small bag bodies 100 to the constant-open type venthole 19A side, as illustrated in FIG. 15), a gas-discharging outlet 103 that allows the inside and the outside of the small bag body 100 to communicate with each other is provided. That is, the gas in the airbag 10C is configured to be capable of being discharged toward the outside of the airbag 10C while passing through the inside of each of the small bag bodies 100 and the gas-discharging outlet 103 from each of the open-and-close type ventholes 18. In this embodiment, the gas discharging outlet 103 is formed of a slit extending in a direction to connect the tip end side and the base end side of each of the small bag bodies 100.

Incidentally, each of the left and right small bag bodies 100 is formed to have approximately the same shape and the same size.

The construction of the airbag 10C other than above-described is the same as that in the airbag 10 in FIGS. 1 through 5 described above, and the same numerals used in FIGS. 15 through 17 denote the same components as those in FIGS. 1 through 5.

An operation of the airbag apparatus provided with the thus constructed airbag 10C is as follows.

In a similar manner as that in each of the above-described embodiments, at a time of a collision of a vehicle, or the like, the inflator 36 is activated and the gas is blown out into the airbag 10C, and the airbag 10C is expanded by means of the gas. In addition, the airbag 10C pushes to open the module cover 48 and is developed into the vehicle interior.

At this moment, the middle portion of the tether 70C is pulled toward the occupant side along with the expanding operation of the front panel 12 of the airbag 10C toward the occupant side, and thereby both end sides of the tether 70C are pulled into the inside of the airbag 10C, respectively. Thereby, the tip end side of each of the small bag bodies 100 is pulled toward each of the constant-open type venthole 19A side by means of the tether 70C, and each of the small bag bodies 100 is crushed into a flat shape as illustrated in FIG. 15 and FIG. 17(*a*), and is overlapped on the outer surface of the airbag 10C. Thereby, the gas-discharging outlet 103 of each of the small bag bodies 100 is closed and the discharge of the gas to the outside of the airbag 10C is limited. As a result, the airbag 10C is rapidly expanded.

In this embodiment, the gas-discharging outlet 103 is formed of the slit extending in a direction for connecting the base end side and the tip end side of each of the small bag bodies 100. Accordingly, when the tip end side of each of the small bag bodies 100 is pulled by means of the tether 70C, since tension force is added to a side surface of each of the small bag bodies 100 in a slit-extending direction, edge portions of both sides of the slit are tensed and the slit is brought to a closed state. Therefore, a closing characteristic of the gas-discharging outlet 103 is good.

Thereafter, in a case that the occupant P contacts the expanded airbag 10C, the front panel 12 of the airbag 10C is retreated toward the rear panel 14 side by means of being pressed by the occupant P, and the tether 70C is loosened, as illustrated in FIG. 16. As a result, each of the small bag bodies 100 becomes to be able to be separated from the outer surface of the airbag 10C, and the gas flows into the inside of each of the small bag bodies 100 from the inside of the airbag 10C via each of the open-and-close type ventholes 18, and each of the small bag bodies 100 starts expanding sideward of the airbag 10C, as illustrated in FIG. 16 and FIG. 17(*b*). Thereby, the gas-discharging outlet 103 of each of the small bag bodies 100 is opened and the gas in the inside of the airbag 10C is discharged from each of the open-and-close type ventholes 18 toward the outside of the airbag 10C while passing through the inside of each of the small bag bodies 100 and the gas-discharging outlet 103. Thus, the occupant P is softly received by means of the airbag 10C.

Incidentally, as described above, in this embodiment, although the gas-discharging outlet 103 is formed of the slit extending in a direction for connecting the base end side and the tip end side of each of the small bag bodies 100, when the tether 70C is thus loosened and each of the small bag bodies 100 starts to expand sideward of the airbag 10C, as illustrated in FIG. 17(*b*), the edge portions of both sides of the slit are broadened in a direction perpendicular to an extending direction of the slit by means of the tension force applied in a peripheral direction of each of the small bag bodies 100. This results in forming the gas-discharging outlet 103 to be opened by a large amount.

In this airbag 10C, as illustrated in FIG. 15, since the tether 70C also couples the vicinity of the middle portion in the left and right direction of the front panel 12 with each of the small bag bodies 100, the loosening amount of the tether 70C becomes largest when the occupant P contacts the center portion, in the left and right direction, of the front panel 12 and causes the center portion to retreat toward the rear panel 14 side. In contrast, in a case that the occupant P contacts a position that is deviated to the left side or the right side from the center portion, in the left and right direction, of the front panel 12, the retreating amount of the center portion, in the left and right direction, of the front panel 12 to the rear panel 14 side becomes small as compared to a case that the occupant P directly contacts the center portion, as illustrated in FIG. 15. Thereby, the loosening amount of the tether 70C also becomes small. The more the position on the front panel 12, with which the occupant P contacts, is deviated to the left end side or the right end side of the front panel 12, the smaller the loosening amount of the tether 70C becomes.

Furthermore, in this airbag 10C, when the occupant P contacts the center portion, in the left and right direction, of the front panel 12 and causes the center portion to retreat toward the rear panel 14 side, the tether 70C also starts loosening in the earliest manner, and the more the position on the front panel 12, with which the occupant P contacts, is deviated from the center portion to the left end side or the right end side of the front panel 12, the later the timing when the tether 70C starts loosening becomes.

In this airbag 10C, an opening amount of the gas-discharging outlet 103 of each of the small bag bodies 100 (i.e., a separating distance of each of the small bag bodies 100 from the outer surface of the airbag 10C) also increases or decreases in proportional to the loosening amount of the tether 70C. Accordingly, the opening amount of the gas-discharging outlet 103 becomes largest when the occupant P contacts the center portion, in the left and right direction, of the front panel 12 of the expanded airbag 10C, and the more the position on the front panel 12, with which the occupant P contacts, is deviated to the left end side or the right end side of the front panel 12, the smaller the opening amount of the gas-discharging outlet 103 becomes. Moreover, the opening timing of the gas-discharging outlet 103 depends on the timing when the tether 70C starts loosening. Accordingly, the gas-discharging outlet 103 opens in the earliest manner when the occupant P contacts the center portion, in the left and right direction, of the front panel 12, and the more the position on the front panel 12, with which the occupant P contacts, is deviated to the left end side or the right end side of the front panel 12, the later the opening timing of the gas-discharging outlet 103 becomes.

Accordingly, in this airbag 10C, it is also possible to sufficiently discharge the gas to the outside of the airbag 10C from the gas-discharging outlet 103 when the occupant P contacts the center portion, in the left and right direction, of the front panel 12 of the expanded airbag 10C, and to suppress the discharge of the gas to the outside of the airbag 10C when the occupant P contacts the left end side or the right end side in a manner deviated from the center portion, in the left and right direction, of the front panel 12.

In addition, in this airbag 10C, it is also possible to rapidly discharge the gas from the gas-discharging outlet 103 when the occupant P contacts the center portion, in the left and right direction, of the front panel 12 of the expanded airbag 10C, and to sufficiently receive the occupant P by means of delaying the opening timing of the gas-discharging outlet 103 when the occupant P contacts the left end side or the right end side of the front panel 12 in the deviated manner.

Incidentally, as illustrated in FIGS. 15 and 16, the airbag 10C is also expanded to have a shape in which the more the position on the airbag 10C approaches an outer peripheral side thereof, the smaller the thickness becomes. However, in this airbag 10C, as described above, the more the position on the front panel 12, with which the occupant P contacts, is deviated to the left end side or the right end side of the front panel 12, the smaller the opening amount of the gas-discharging outlet 103 also becomes. Thereby, the discharge of the gas to the outside of the airbag 10C is suppressed, and the opening timing of the gas-discharging outlet 103 is delayed. As a result, even when the occupant P contacts the left end side or the right end side of the front panel 12 in the deviated manner, there is no possibility that the front panel 12 collides with a bottom of the airbag 10C, and the occupant P can sufficiently be received by means of the airbag 10C.

In this embodiment, in the airbag 10C, since the open-and-close type ventholes 18, the constant-open type ventholes 19A, the small bag bodies 100 (each of the gas-discharging outlets 103), and the tethers 70C are symmetrically constructed while sandwiching a middle portion in the left and right direction of the airbag 10C, the left and right gas-discharging outlets 103 can approximately be evenly opened and closed.

The aforementioned embodiments are illustrative, and the present invention is not limited to the aforementioned embodiments.

For example, in each of the embodiments in FIGS. 1 through 5, FIGS. 6 through 9, and FIGS. 10 through 14, although one open-and-close type venthole 18 is provided, two or more open-and-close type ventholes 18 may be provided. Further, in the embodiment in FIGS. 15 through 17, although two open-and-close type venthole 18 are provided, one venthole may be provided, or two or more ventholes may be provided.

In each of the aforementioned embodiments, a constant-open type venthole allowing the inside and outside of an airbag to communicate with each other, while not serving as a connecting member insertion hole may be provided.

In each of the aforementioned embodiments in FIGS. 1 through 5, and FIGS. 6 through 9, although the lid body is configured to close an entire open-and-close type venthole, the lid body may be configured to change the opening amount of the open-and-close type venthole from a large opening amount to a small opening amount. For example, it may be constructed such that even when the lid body is overlapped with the open-and-close type venthole, the open-and-close type venthole partly protrudes from the lid body, and the gas is allowed to be discharged from the protruding portion. Alternatively, it may be constructed such that a hole having a smaller diameter than that of the open-and-close type venthole is provided at a position in the lid body, which is overlapped with the open-and-close type venthole, and the gas is allowed to be discharged through the hole even when the open-and-close type venthole is closed.

In the aforementioned embodiments, although each of the ventholes is formed of an approximately round shaped opening, the shape of each of the ventholes is not limited thereto, and a shape other than the round shape, for example, a slit shape may be applicable.

The aforementioned embodiments are examples of the present invention to an airbag and an airbag apparatus for use in a driver's seat of a vehicle. However, the present invention may be applicable to various types of airbags and airbag apparatuses other than the above-described, and for example, to an airbag and an airbag apparatus for use in a passenger's seat or a rear seat of a vehicle, and so forth.

The disclosure of Japanese Patent Application No. 2007-292236 filed on Nov. 9, 2007 are incorporated in the application.

While the invention has been explained with reference to the specific embodiments of the invention, the explanation is illustrative, and the invention is limited only by the appended claims.

What is claimed is:

1. An airbag comprising:
an airbag panel having a front panel and a rear panel,
a single open-and-close venthole, the venthole being located in the rear panel;
first and second hanging straps interconnecting the front and rear panels, the first and second hanging straps extending essentially parallel to one another when the airbag is inflated;
a constant-open vent hole in the rear panel adjacent to the open-and-close venthole, the constant-open venthole being smaller than the open-and-close venthole;

a tether having a first end and a second end, the first end being connected with the first hanging strap at a location between the front and rear panels, the tether extending from the first hanging strap out of the airbag through the constant-open vent hole so that the second end is located outside of the airbag; and a limiting member for limiting a discharge of a gas from the open-and-close venthole, the limiting member closing the open-and-close venthole when an object does not contact an outer surface of the airbag, and opening the open-and-close venthole so that the gas is discharged outside the airbag from the open-and-close venthole when the object contacts the outer surface of the expanded airbag to retreat the outer surface toward an inside of the airbag during expansion of the airbag panel, wherein the limiting member is configured such that a total amount of the gas discharged from the open-and-close venthole becomes largest when the object contacts a center portion, in a left and right direction, of an occupant-facing surface of the front panel of the expanded airbag, and wherein the limiting member comprises a sector-shaped lid body which is configured to close the open-and-close venthole, the sector-shaped lid body having an angled corner integral with the second end of the tether.

2. The airbag according to claim 1, wherein the sector-shaped lid body completely or nearly closes the open-and-close venthole when the object does not contact the outer surface of the airbag upon inflation of the airbag, and the sector-shaped lid body opens or enlarges the open-and-close venthole when the object contacts the outer surface.

3. The airbag according to claim 1, wherein the sector-shaped lid body is configured such that a delay until the open-and-close venthole is opened after the object contacts the outer surface of the airbag becomes shortest when the object contacts the center portion, in a left and right direction, of the occupant-facing surface of the expanded airbag.

4. The airbag according to claim 3, wherein the first hanging strap is configured such that as a position on the expanded airbag, with which the object contacts, is spaced apart from the center portion, in the left and right direction, of the occupant-facing surface toward two end sides in the left and right direction, the time until the open-and-close venthole is opened in a large amount after the object contacts the outer surface of the airbag becomes longer.

5. The airbag according to claim 1, wherein the sector-shaped lid body is configured such that the open-and-close venthole is closed, by applying a tension force to to the first hanging strap, and is opened by reducing the tension force applied, wherein the first hanging strap is connected to a center portion of the airbag, in the left and right direction, of an occupant-facing surface of the front panel of the airbag, and wherein in case the airbag is expanded, when the object does not contact the occupant-facing surface, the first hanging strap is under tension so that the tension force applied to the first hanging strap is added to the sector-shaped lid body via the tether to close the open-and-close venthole, and when the object contacts the occupant-facing surface of the expanded airbag, the first hanging strap and the tether are loosened so that the tension force added to the sector-shaped lid member is reduced to open the open-and-close venthole.

6. The airbag according to claim 5, wherein the sector-shaped lid body overlaps the open-and-close venthole, and wherein when the object contacts the occupant-facing surface of the expanded airbag to and the occupant-facing surface retreats toward the inside of the airbag, the first hanging strap and the tether are loosened so that the sector-shaped lid body becomes spaced apart from the open-and-close venthole by gas pressure inside the airbag to open the open-and-close venthole.

7. The airbag according to claim 1, wherein the open-and-close venthole is disposed in a vicinity of a middle portion, in a left and right direction, of a surface of the rear airbag panel on a side opposite to the object, and at an upper side or a lower side in relation to the center in an upper and lower direction during the expansion of the airbag.

8. An airbag apparatus including the airbag according to claim 1, and an inflator for expanding the airbag.

9. The airbag according to claim 1, wherein:

tension in the tether controls the amount of opening of the sector-shaped lid body;

tension in the first hanging strap controls the tension in the tether; and when the airbag is inflated, the tension in the first hanging strap is reduced when the outer surface retreats toward the inside of the airbag when the object contacts the outer surface.

10. The airbag according to claim 9, wherein the first hanging strap is connected to the airbag panel at a location so that when the object contacts the airbag panel immediately proximate the location, the reduction intension in first hanging strap is maximized, and when the object contacts the airbag panel to the left or right of the location in the occupant facing direction, the reduction in tension in the first hanging strap is attenuated and the opening of the venthole is one of delayed or reduced.

11. The airbag according to claim 1, wherein the airbag is a non-partitioned airbag having a single chamber which includes only two hanging straps.

12. The airbag according to claim 1, wherein first ends of the first and second hanging straps are connected to the front panel and opposite second ends are connected to the rear air bag panel by respective rear side-hanging strap half members.

13. The airbag according to claim 1, wherein the single open-and-close venthole is positioned near an upper portion of a vehicle steering wheel rim when the airbag is inflated.

* * * * *